United States Patent [19]

Yamashita

[11] Patent Number: 5,694,525
[45] Date of Patent: Dec. 2, 1997

[54] METHOD FOR FILING AND SYNTHESIZING OF KNOWLEDGE BASE AND FUZZY CONTROL SYSTEM USING THE SAME

[75] Inventor: Yoshiomi Yamashita, Nagoya, Japan

[73] Assignee: Mitsubishi Denki Kabushiki Kaisha, Tokyo, Japan

[21] Appl. No.: 663,606

[22] Filed: Jun. 14, 1996

Related U.S. Application Data

[63] Continuation of Ser. No. 159,628, Dec. 1, 1993, abandoned.

[30] Foreign Application Priority Data

Dec. 2, 1992 [JP] Japan ................................ 4-323171

[51] Int. Cl.$^6$ ........................................... G06F 15/18
[52] U.S. Cl. ............................ 395/61; 395/3; 395/900
[58] Field of Search .................................. 395/3, 10–11, 395/51, 61, 71, 77, 900, 922, 700; 364/157, 164

[56] References Cited

U.S. PATENT DOCUMENTS

| | | | |
|---|---|---|---|
| 5,021,992 | 6/1991 | Kondo | 395/54 |
| 5,043,862 | 8/1991 | Takahashi et al. | 364/162 |
| 5,084,813 | 1/1992 | Ono | 395/700 |
| 5,165,011 | 11/1992 | Hisano | 395/54 |
| 5,253,332 | 10/1993 | Kumamoto | 395/51 |
| 5,295,061 | 3/1994 | Katayama et al. | 364/157 |
| 5,377,308 | 12/1994 | Inoue et al. | 395/61 |
| 5,579,441 | 11/1996 | Bezek et al. | 51/3 |

FOREIGN PATENT DOCUMENTS

| | | | |
|---|---|---|---|
| 0403753 | 12/1990 | European Pat. Off. | G06F 9/44 |
| 1286041 | 11/1989 | Japan | G06F 9/44 |
| 312740 | 1/1990 | Japan | G06F 9/44 |
| 2194437 | 8/1990 | Japan | G06F 9/44 |
| 3296140 | 12/1991 | Japan | G06F 9/44 |
| 452927 | 2/1992 | Japan | G06F 9/44 |

OTHER PUBLICATIONS

"Methodology of Fuzzy Control", Shuta Murakami and Mikio Maeda, Journal of the Society on Instrument and Central Engineers, vol. 128, No. 11, 1989, p. 954.

Tsuji et al, "Application of the expert system to elevator group-supervisory control"; Proceedings. The fifth conference on artificial intelligence applications, pp. 287–294, 6–10 Mar. 1989.

Bortolan et al, "A fuzzy pattern matching technique for dignostic ECG classification"; Proceedings. Computers in cardiology 1988, pp. 551–554, 25–28 Sep. 1988.

Burkhardt et al, "Automated fuzzy knowledge base generation and tuning"; IEEE International conference on fuzzy systems, pp. 179–188, 8–12 Mar. 1992.

*Primary Examiner*—Tariq R. Hafiz
*Attorney, Agent, or Firm*—Sughrue, Mion, Zinn, Macpeak & Seas, PLLC

[57] ABSTRACT

A method of synthesizing knowledge bases for a fuzzy control system allowing use of individual knowledge base according to states of an system to be controlled, wherein different elements between a reference knowledge base and a secondary knowledge base derived from the standard knowledge base, the secondary knowledge base is filed with the different elements related thereto, and another knowledge base is synthesized by reading out the secondary knowledge base as well as the different elements.

28 Claims, 14 Drawing Sheets

METHOD FOR FILING AND SYNTHESIZING OF KNOWLEDGE BASE AND FUZZY CONTROL SYSTEM USING THE SAME

This is a Continuation of application Ser. No. 08/159,628 filed Dec. 1, 1993 now abandoned.

FIELD OF THE INVENTION

This invention relates to a fuzzy control system selectively using multiple knowledge bases for fuzzy control depending on the status of a controlled system.

BACKGROUND OF THE INVENTION

FIG. 13 shows a manner of filing fuzzy knowledge bases in a usual operating system (for instance "MS-DOS, UNIX, etc.). Designated at 121 is a membership function group, at 122 a rule group, and at 123 a knowledge base store. Designated at 124 is a knowledge base, which comprises specified membership functions and rules in the figure.

FIG. 14 shows a usual process of editing a fuzzy control knowledge base. Designated at 131 is a knowledge base, at 132 a reference knowledge base, at 133 a knowledge base obtained by edition, at 134 the content of a reference knowledge base 132, and at 135 the content of a knowledge base obtained by edition.

FIG. 15 shows a block diagram of a self-controlled fuzzy control system shown in "Measurement and Control", Vol. 128, No. 11, 1989, page 954. Designated at 141 is a data storage unit, at 142 an evaluation unit, at 143 a fuzzy control rule correction unit, at 144 a scaling factor control unit, at 145 a scaling factor setting unit, at 146 a fuzzy control rule setting unit, at 147 a fuzzy deduction unit, and at 148 a controlled system. Designated at 149 is a usual fuzzy control system comprising the scaling factor setting unit 145, fuzzy control rule setting unit 146 and fuzzy deduction unit 147.

Operation will next be described. In a knowledge base in a usual fuzzy control system, there are multiplicities of rules and membership functions. In current fuzzy control system development support systems and fuzzy control systems, each knowledge base is dealt with as an independent knowledge base. FIG. 13 shows a manner of filing such knowledge bases in fuzzy control system. As shown, a membership function group (consisting of membership functions 1 and 2), and a rule group 122 (consisting of rules 1 to 6) are filed as an independent knowledge base 124 (KB1) in the knowledge base store 123.

In many cases of actual fuzzy control system development, a large quantity of similar knowledge bases are produced, and their operation is evaluated. Also, there are many cases of producing knowledge bases for like systems or the same system model. In such cases, the individual knowledge bases are mostly not substantially different, and there are only slight differences to such extents as to cover the differences of individual systems or control subjects. Therefore, in these cases it is usual to produce many knowledge bases by modifying a reference knowledge base.

FIG. 14 shows such a manner of producing a knowledge base by editing. As shown, a reference knowledge base 132 is selectively read out of a knowledge base 131 into an editing system. In the editing system, the read-out reference knowledge system 132 is displayed as its membership functions and rules on a display 134 for editing. The knowledge base which is obtained by editing, is filed as a new independent after edition knowledge base 133 in the knowledge base 131. In the contents 134 and 135 of the reference and after-edition knowledge bases 132 and 133, designated at 1A to 1E, 2A to 2E and N1C are labels of membership functions. In the illustrated example, label 1C of membership function 1 in the reference knowledge base 132 is changed to N1C in the after-edition knowledge base 133, and Rule 3 is changed in an interlocked relation.

Early fuzzy control systems executed only preset fuzzy role groups. Most current fuzzy control systems are also of this type. In this type of fuzzy control system, it was difficult to permit control of such complicated control subjects as subject to changes in characteristics depending on the situation. To obviate this drawback, there have been announced fuzzy control systems, which change fuzzy rule group depending on the status of the controlled system.

Such a fuzzy control system, which will change the content of control depending on the status of a controlled system, is called a self-controlled fuzzy control system. In the system illustrated in FIG. 15, a control deviation input to the fuzzy control system 149 is transferred, after extraction of a first- and a second-stage difference, to the respective scaling factor setting units 145. The role of the scaling factor is the conversion of the dimension or unit. Thus, conversion between an actual external data scale and an internal multiple purpose data scale is effected. After the conversion from the actual external data scale to the internal multiple purpose data scale in the scaling factor setting units 145, the control deviation input is transferred to the fuzzy deduction unit 147.

The fuzzy deduction unit 147 performs fuzzy deduction on the basis of fuzzy control rules set in the fuzzy control rule setting unit 146. The result of fuzzy deduction obtained in the fuzzy deduction unit 147, is transferred as an amount of fuzzy control operation to the output side scaling factor setting units 145. The output side scaling factor setting unit 145 effects conversion from the internal multiple purpose data scale to the actual external data scale, and it outputs the converted fuzzy control operation amount by the scaling factor setting units 145 to the controlled system 148.

The output of the controlled system 148 is transferred to the input section of the fuzzy control unit 149 and at the same time transferred to the data storage unit 141. To the data storage unit 141 is also transferred the fuzzy deduction result from the fuzzy deduction unit 147. The data storage unit 141 stores the transferred data. The evaluation unit 142 evaluates the result of control by using the control result data stored in the data storage unit 141 and on the basis of predetermined evaluation standards. The result of evaluation obtained in the evaluation unit 142 is transferred to the fuzzy control rule correction unit 143 and the scaling factor control unit 144.

The fuzzy control rule correction unit 143 effects fuzzy control rule correction by using the evaluation result and after a predetermined procedure. The scaling factor control unit 144 effects scaling factor control by using the evaluation result and after a predetermined procedure. By repeatedly performing is the above cycle of control and correction, it possible to change fuzzy rule group in dependence on the status of the controlled system.

As other reference literatures relating to the present invention, there are Japanese Patent Laid-open No. HEI 4-125735, Patent Laid-open No. HEI 4-52927, Patent Laid-open No. HEI 3-296140, Patent Laid-open No. HEI 3-12740, Patent Laid-open No. HEI 2-194437, and Patent Laid-open No. HEI 1-286041.

For filing and controlling fuzzy control knowledge bases, small memory capacity personal computers or the like are used in many cases. Thus, there is a strong demand for an inexpensive and small-scale knowledge base filing and controlling system. However, the conventional fuzzy control knowledge base filing and managing systems, having the construction as described before, directly use conventional operating system file management functions. Therefore, a large number of similar knowledge bases are all dealt with as independent knowledge bases, thus dictating an enormous memory capacity which is proportional to the number of knowledge bases involved.

Meanwhile, changes in the status of a controlled system can in most cases be grasped beforehand at the time of the design. Therefore, in practical applications of a fuzzy control system, it is possible to prepare adequate fuzzy control knowledge bases beforehand for various expected statuses of the controlled system. For this reason, there is a strong demand for an inexpensive and small-scale fuzzy control system, which can cope with previously expected changes in the controlled system status at the setting instantly and with stability.

The conventional self-controlled fuzzy control system, which is adapted to change the content of control in dependence on the status of a controlled system, can change fuzzy control knowledge bases depending on the status of the controlled system. However, the processes of the control result evaluation and of the correction of the fuzzy control knowledge base, are complicated and require a long time. To reduce time required for these processes, it is necessary to increase the hardware scale. This leads to a cost increase. In addition, since the processes of evaluation and correction are performed at all times, the control is subject to the influence of external disturbances and is liable to be unstable.

SUMMARY OF THE INVENTION

It is an object of the invention to provide a method for filing and synthesizing knowledge bases and fuzzy control system using the same with instant and selective use of the multiple knowledge bases in dependence on the status of a controlled system, which permit efficient filing and managing of multiple knowledge bases, and which permit instant and selective use of multiple knowledge bases with stability in dependence on the status of a controlled system.

According to the invention, in which multiple knowledge bases are filed and managed according to their mutual relationship, it is possible to reduce the memory capacity for filing and managing multiple knowledge bases for fuzzy control.

According to the invention, in which multiple knowledge bases for fuzzy control are managed by the provision of knowledge base synthesis means for synthesizing a necessary knowledge base, difference intelligence extraction means for extracting difference intelligence of the synthesized knowledge base from a reference knowledge base, data configuration management means for managing the configuration of knowledge base, management table file means for filing knowledge base management data, actual data management means for managing actual knowledge base data, actual data file means for filing actual knowledge base data, and knowledge base management means for managing knowledge base by collectively controlling the individual means, it is possible to reduce the memory capacity for filing and managing multiple knowledge bases for fuzzy control.

According to the invention, in which a knowledge base is synthesized by causing a membership function deleter to delete a portion of a reference membership function for substitution by a difference membership function, causing a rule deleter to delete a portion of a reference rule for substitution by a difference rule, and substantially causing a difference knowledge base introducing a difference knowledge base into the reference knowledge obtained after the deletion, it is possible to obtain ready synthesis of a knowledge base.

According to the invention, in which difference intelligence is extracted by causing a full comparator to fully compare a reference knowledge base and a knowledge base obtained after edition, and causing a difference intelligence extractor to extract difference intelligence of the knowledge base obtained after edition from the reference knowledge base, it is possible to obtain ready extraction of difference intelligence.

According to the invention, in which the knowledge base data configuration is managed by causing a reference knowledge base management table to manage the locality of a group of reference knowledge bases, causing a different membership function management table to manage the locality of a group of difference membership functions, and causing a difference rule management table to manage the locality of a group of difference rules, it is possible to obtain ready knowledge base data configuration management.

According to the invention, in which management table data are filed by causing filing of configuration data of all knowledge bases in a knowledge base management table, causing filing of the first addresses of a reference and a difference knowledge base constituting each knowledge base in each knowledge base pointer, causing a difference rule off-set address generation adder to calculate an address for filing an actual difference rule, and causing a difference membership function off-set address generation adder to calculate an address for filing an actual difference membership function, it is possible to obtain efficient management table filing.

According to the invention, in which a reference knowledge base memory address is generated by causing designation of the gross class of a reference knowledge base with a gross class selection code, generating the first address of a reference knowledge base with a reference knowledge base code, causing a gross class selection code mapping memory to generate a gross class first address from a gross class selection code, causing a reference knowledge base selection mapping memory to generate the first address of a reference knowledge base from a reference knowledge base selection code, causing an actual address generation adder to generate an actual address by adding a gross class first address and a reference knowledge base first address, and causing generation of a reference knowledge base address with a reference knowledge base pointer, it is possible to readily generate the reference knowledge base memory address.

According to the invention, in which a difference membership function file address is generated by causing a difference membership function pointer address generation adder to generate a difference membership function pointer address from a knowledge base pointer address for filing the first address of a knowledge base pointer and a difference membership function pointer off-set address for filing data about the amount of off-set from the first address of a knowledge base pointer till a difference membership function pointer, causing filing of the difference membership function first address in a difference membership function pointer, causing generation of a lower address of a difference membership function file address from a difference membership function selection code mapping memory by using a difference membership function selection code, and subsequently causing a difference membership function file address generation adder to add the first address and a lower address of the difference membership function file address, it is possible to readily generate the difference membership function file address.

According to the invention, in which a difference rule file address is generated by causing a difference rule pointer address generation adder to generate a difference rule pointer address from a knowledge base pointer address for filing the first address of a knowledge base pointer and a difference rule pointer off-set address for filing data about the amount of off-set from the first address of the knowledge base pointer till the difference rule pointer, causing filing of the difference rule first address in the difference rule pointer, causing generation of a lower address of a difference rule file address by using a difference rule selection code mapping memory, and subsequently causing a difference rule file address generation adder to add difference rule pointer data and the difference rule file address lower address, it is possible to readily generate the difference rule file address.

According to the invention, in which actual data of multiple knowledge bases in a fuzzy control system are filed by causing filing of reference knowledge data in a reference knowledge base memory, causing filing of difference membership function data in a difference membership function memory and filing difference rule data in a difference rule memory, it is possible to readily file actual data of multiple knowledge bases for fuzzy control.

According to the invention, in which multiple knowledge bases in a fuzzy control system are managed by causing a knowledge case synthesizer to synthesize a derived knowledge base from a reference knowledge base and a difference knowledge base, causing a difference intelligence extractor to generate a difference knowledge base through comparison of the reference and derived knowledge bases, causing a data configuration manager to manage the configurations of the reference and difference knowledge bases, causing a management table file to maintain and manage the knowledge base configuration, causing an actual data manager to file the knowledge base entity and causing a knowledge base management master to control the flow of all data, it is possible to readily manage multiple knowledge bases for fuzzy control.

According to the invention, the execution of multiple knowledge bases is controlled by causing filing of the multiple knowledge bases with less memory capacity according to differences of the knowledge bases, and synthesizing, if necessary, a knowledge base, it is possible to obtain ready control of the execution of multiple knowledge bases.

According to the invention, in which the fuzzy control is realized by permitting efficient management of multiple knowledge bases by knowledge base management means, causing filing of multiple knowledge base management data in management table file means, permitting management of actual knowledge base data by actual data file means, causing, if necessary, knowledge base synthesis means to synthesize a knowledge base, allowing execution request acceptance means to accept execution requests from a sequencer, causing, for managing fuzzy control execution, fuzzy control execution management means to deliver instructions of generation, selection and switch timing of execution knowledge bases according to the execution requests from the sequencer, causing filing of execution knowledge bases generated according to requests from the sequencer in execution knowledge base file means, causing fuzzy control execution means having fuzzy deduction functions to execute actual fuzzy control, and permitting input and output of data with respect to a controlled system through an input-output interface, it is possible to readily optimize the fuzzy control.

According to the invention, in which the fuzzy control is realized by further causing filing of configuration data of all knowledge bases in a knowledge base management table, causing filing of the first addresses of a reference and a difference knowledge base constituting each knowledge base in a knowledge base pointer, causing a difference rule off-set address generation adder to calculate an actual difference rule file address, and causing a difference membership function off-set address to calculate an actual difference membership function file address, it is possible to readily calculate the address for filing the actual difference membership function.

According to the invention, in which the fuzzy control is realized by further causing designation of the gross class of a reference knowledge base according to a gross class selection code, causing generation of the first address of the reference knowledge base according to a reference knowledge base selection code, causing generation of a gross class first address by using a gross class selection code mapping memory, causing generation of the first address reference knowledge base from a reference knowledge base selection code by using a reference knowledge base selection code mapping memory, causing an actual address generation adder to generate an actual address from the gross class first address and reference knowledge base first address, and causing generation of a reference knowledge base address by using a reference knowledge base pointer, thereby generating a reference knowledge base memory address, it is possible to readily generate the reference knowledge base memory address.

According to the invention, in which the fuzzy control is realized by further causing a difference membership function pointer address generation adder to generate a difference membership function pointer address from a knowledge base pointer address for filing the first address of a knowledge base pointer and a difference membership function pointer off-set address for filing data about the amount of off-set from the knowledge base pointer first address till a difference membership function pointer, causing generation of the first address of a difference membership function by accessing the difference membership function pointer, causing generation of a lower address of a difference membership function file address from a difference membership function selection code by using a difference membership function selection code mapping memory, and causing a difference membership function file address generation adder to generate a difference membership function file address from the difference membership function pointer data and the difference membership function file address lower address, it is possible to readily generate the difference membership function file address.

According to the invention, in which the fuzzy control is realized by further causing a difference rule pointer generation adder to generate the first address of a difference rule pointer from a knowledge base pointer address for filing the first address of a knowledge base pointer and a difference rule pointer off-set address for filing data about the amount of off-set from the knowledge base pointer first address till a difference rule pointer, the generated data being filed in the difference rule pointer, causing generation of a lower address of a difference rule file address according to a difference rule selection code by using a difference rule selection code mapping memory, and causing a difference rule file address generation adder to generate a difference rule memory address, it is possible to readily generate the difference rule memory address.

According to the invention, in which the fuzzy control is realized by further causing filing of a reference knowledge base in a reference knowledge base memory, causing filing of a difference membership function in a difference membership function memory, and causing filing of a difference rule in a difference rule memory, it is possible to efficiently file the actual data.

According to the invention, the fuzzy control is realized by further causing a membership function deleter to delete a portion of a reference membership function for substitution for by a difference membership function, causing a rule deleter to deleter a portion of a reference rule for substitution for by a difference rule, and causing a difference knowledge base introducer to introduce difference knowledge base data into the reference knowledge base after deletion, it is possible to readily synthesize a knowledge base.

According to the invention, the fuzzy control is realized by further causing a knowledge base synthesizer to synthesize a derived knowledge base from a reference and a difference knowledge base, permitting a data configuration manager to manage the data configuration of the reference and difference knowledge bases, providing a management table file for maintaining and managing the knowledge base configuration, causing filing of the knowledge base entity in an actual data manager, and permitting control of the flow of all data, it is possible to readily manage knowledge bases.

According to the invention, in which the fuzzy control is realized by further causing acceptance of execution requests from a sequencer by a FIFO buffer, which accepts and outputs the execution requests in the order or arrival, it is possible to readily accept knowledge bases.

According to the invention, in which the execution of the fuzzy control is managed by further permitting data exchange between a sequencer CPU and the fuzzy control system through a sequencer CPU interface, permitting command transfer to and status monitoring of a multiple knowledge base management unit through a multiple knowledge base management unit interface, permitting command transfer to and status monitoring of a fuzzy control execution unit through a fuzzy control execution unit interface, and permitting command transfer to and status monitoring of an execution request acceptance unit through an execution request acceptance unit interface, it is possible to readily manage the fuzzy control execution.

According to the invention, in which the fuzzy control is realized by further causing filing of a knowledge base to be actually executed in an execution knowledge base memory, permitting command acceptance from and status monitoring of a fuzzy control execution management unit through a fuzzy control execution management unit interface, and permitting transfer of a synthesized execution knowledge base from a multiple knowledge base management unit through a multiple knowledge base management unit interface, it is possible to readily store the execution knowledge base.

According to the invention, in which the fuzzy control is realized by further causing filing of an execution knowledge base actually used for fuzzy control in an execution knowledge base memory, causing actual deduction engine using the execution knowledge base, and permitting data exchange with a controlled system through an input-output interface, it is possible to readily execute the fuzzy control.

According to the invention, in which an input-output interface with respect to a controlled system is realized with an interface directly coupled to the controlled system, the interface can be facilitated.

According to the invention, the fuzzy control is realized by further causing selection of fuzzy control knowledge bases predetermined in dependence of the status of a controlled system according to instruction from a sequencer CPU, it is possible to realize optimum fuzzy control.

According to the invention, in which the system for filing and managing multiple knowledge bases and the system for controlling multiple knowledge base execution with respect to each knowledge base synthesized or selected from a predetermined knowledge base group in dependence on the status of a controlled system are provided as respective independent systems, it is possible to obtain knowledge base management and execution control in quite independent environments.

According to the invention, in which the system for filing and managing multiple knowledge bases and the system for multiple knowledge base execution control with respect to each knowledge base synthesized or selected from a predetermined knowledge base group in dependence on the status of a controlled system are provided as respective independent systems and connected to each other by parallel path communication, it is possible to permit data transfer at a speed higher than that in the case where the two systems are coupled to each other by a serial line and without need of secondary storage medium, as well as permitting knowledge base management and execution control.

According to the invention, in which the system for filing and managing multiple knowledge bases and the system for multiple knowledge base execution control with respect to each knowledge base synthesized or selected from a predetermined knowledge base group in dependence on the status of a controlled system are provided as respective independent systems and connected to each other by serial line communication, it is possible to permit data transfer with less transfer signal lines compared to the case where the two systems are coupled to each other by a serial line and without need of secondary storage medium, as well as permitting knowledge base management and execution control.

According to the invention, in which the system for filing and managing multiple knowledge bases and the system for multiple knowledge base execution control with respect to each knowledge base synthesized or selected from a predetermined knowledge base group in dependence on the status of a controlled system are provided such that they are integral with each other, it is possible to permit knowledge base management and execution control uni-dimensionally.

Other objects and features of this invention will become understood from the following description with reference to the accompanying drawings.

DESCRIPTION OF THE PREFERRED EMBODIMENT

Figure 1:
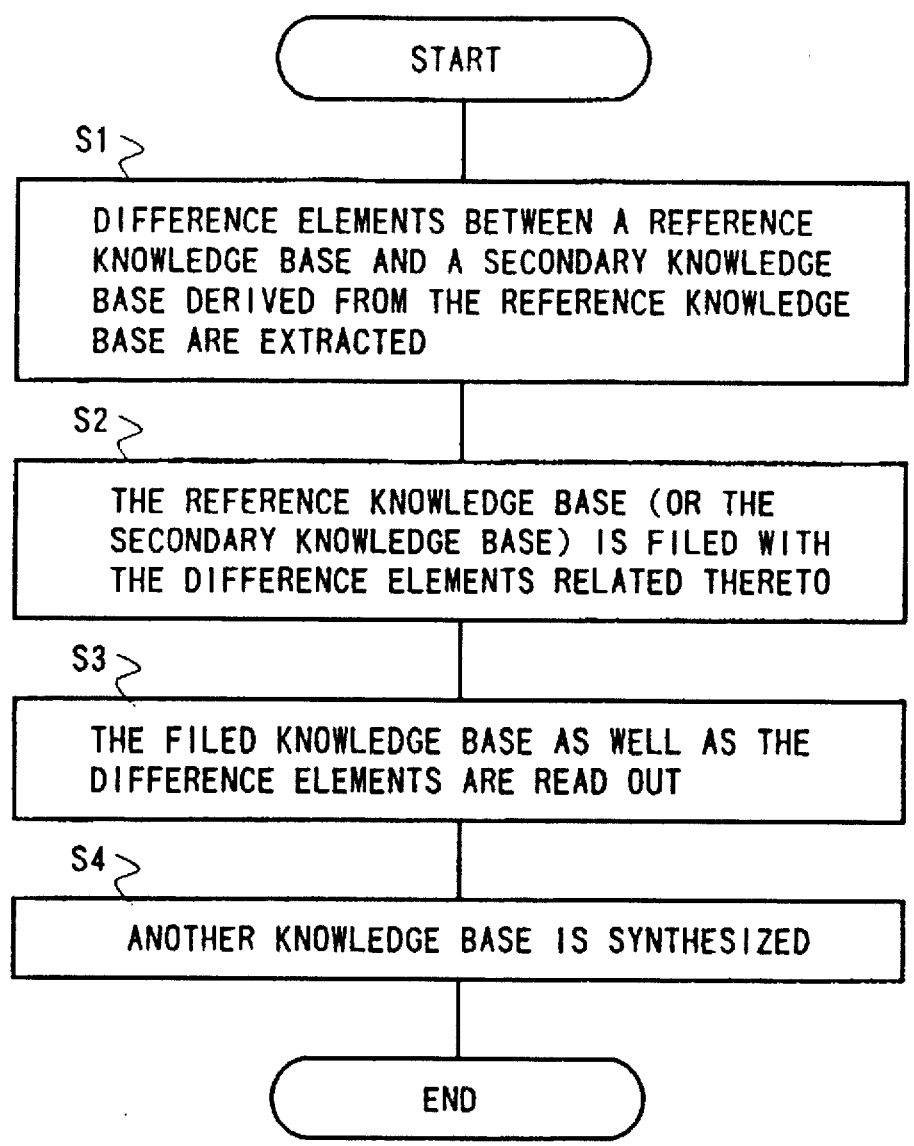
FIG. 1 is a flow chart showing method for filing and composing a knowledge bases according to the invention.
Figure 2:
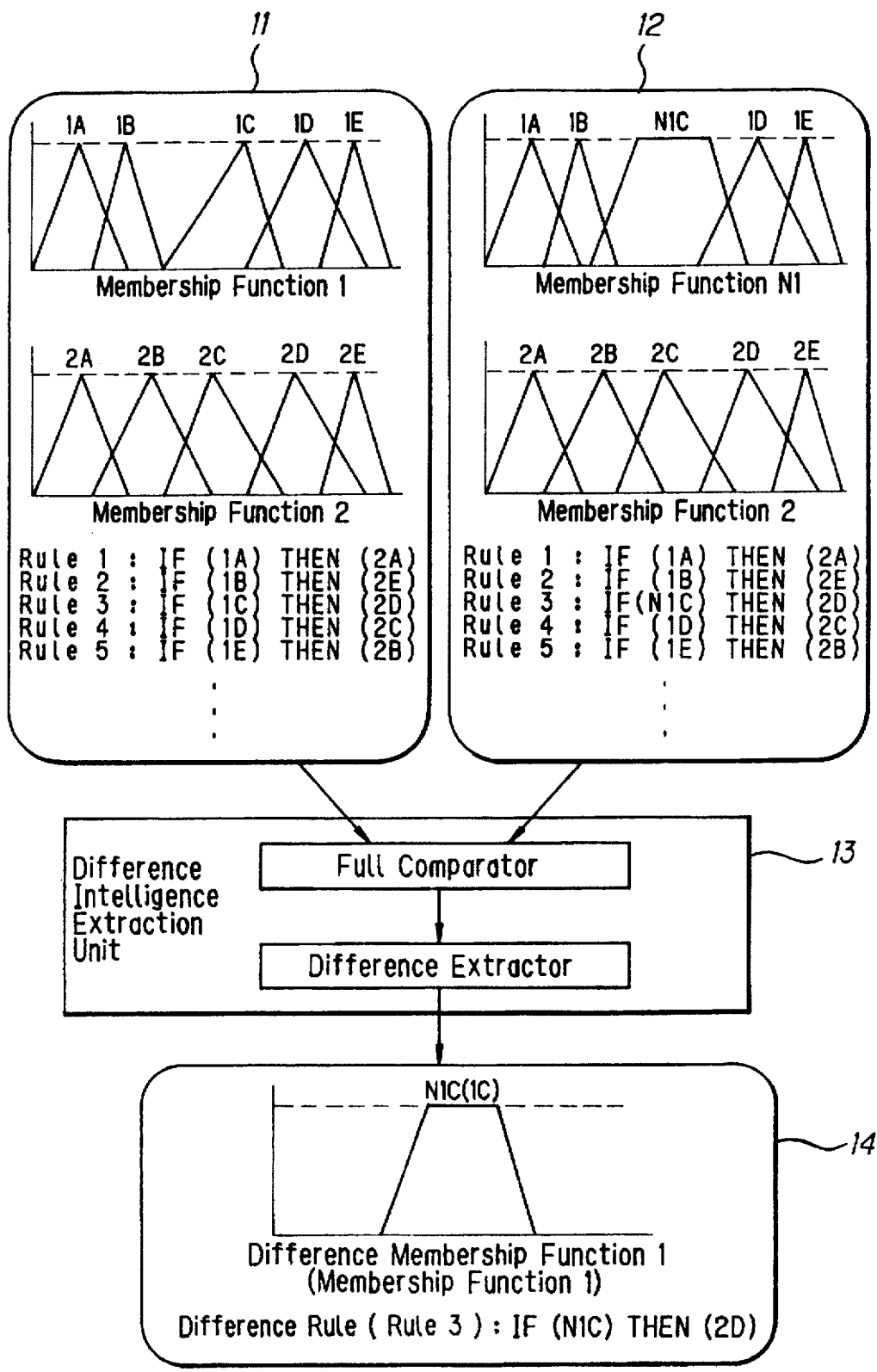
FIG. 2 is a view showing difference intelligence extraction means for extracting difference intelligence of a knowledge base according to the invention.

Now, an embodiment of the invention will be described with reference to the drawings. FIG. 1 is a flow chart showing a method for filing and synthesizing knowledge base according to the invention. In the figure, different elements between a reference knowledge base and a secondary knowledge base derived from the reference knowledge base are extracted according to mutual relationship thereof (S1). Thereafter, the reference knowledge base (or the secondary knowledge base) is filed with the different elements related thereto (S2), and the filed knowledge base as well as the different elements is read out (S3), another knowledge base is synthesized (S4). FIG. 2 shows a difference intelligence extraction means of a fuzzy control knowledge base. Designated at 11 is the content of a reference knowledge base, at 12 the content of a derived knowledge base similar to the reference knowledge base content 11, at 13 a difference intelligence extraction unit for extracting difference intelligence of the derived knowledge base 12 from the reference knowledge base 11, and at 14 the content of a difference knowledge base extracted by the difference intelligence extraction unit 13.

Figure 3:
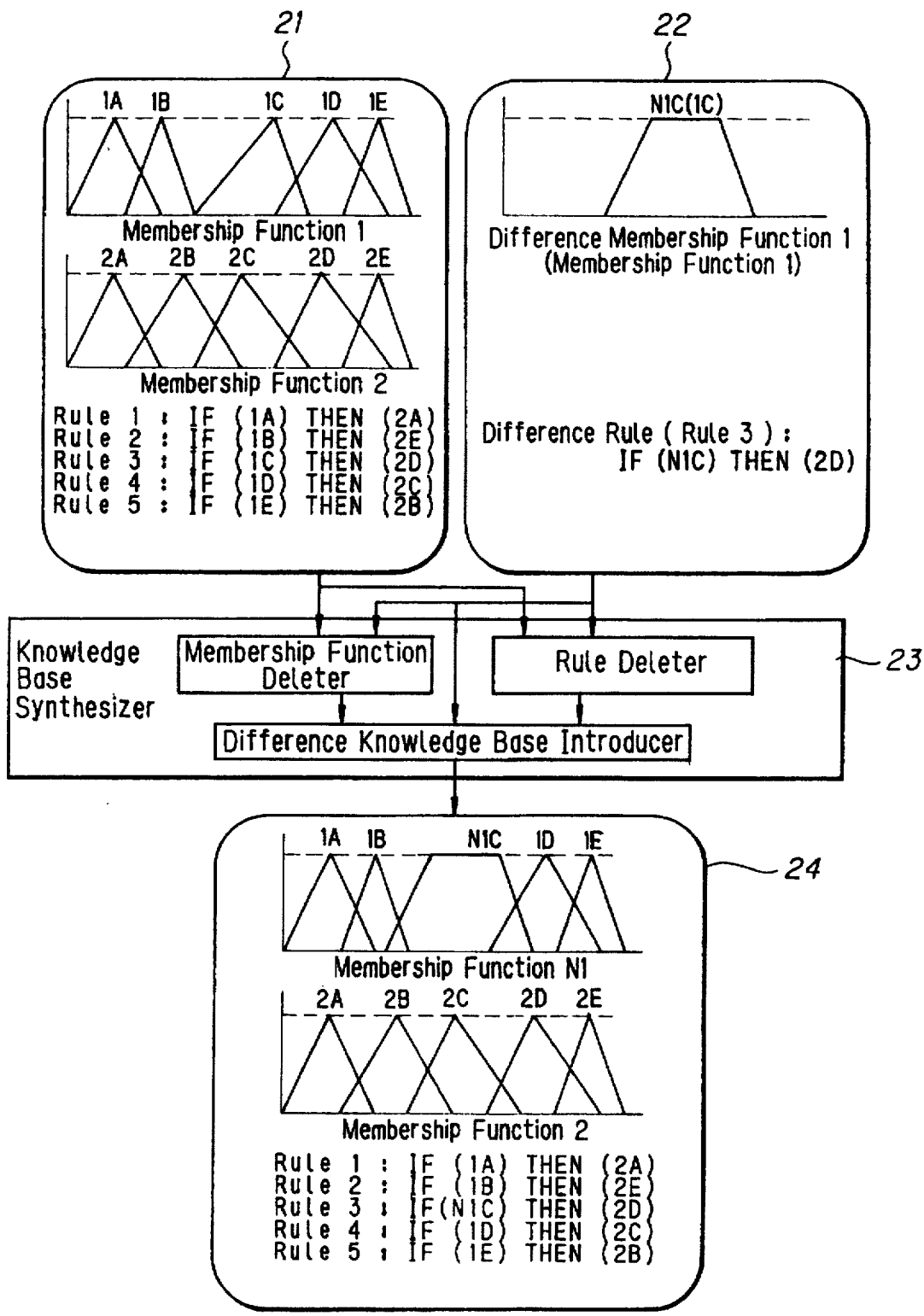
FIG. 3 is a view showing a knowledge base synthesis means for synthesizing a knowledge base according to the invention.

FIG. 3 shows knowledge base synthesis means in the fuzzy knowledge base according to the invention. Designated at 21 is the content of a reference knowledge base, at 22 the content of a difference knowledge base, at 23 a knowledge base synthesizer for combining the contents of the reference and difference knowledge bases 21 and 22, and at 24 the content of a derived knowledge base synthesized by the knowledge base synthesizer 23.

Figure 4:
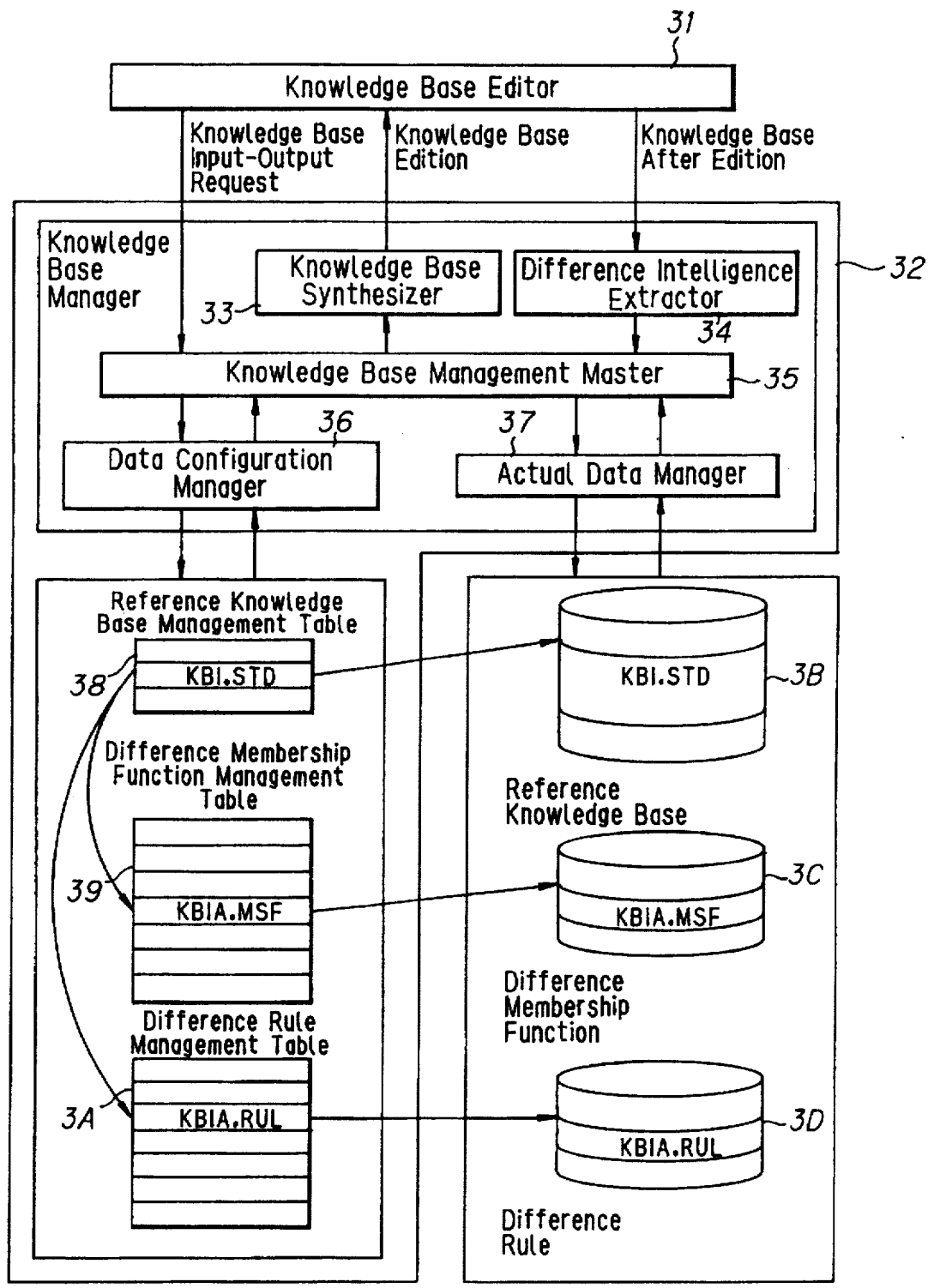
FIG. 4 is a view showing a system for filing and managing multiple knowledge bases for fuzzy control according to the invention.

FIG. 4 shows a system for filing and managing multiple knowledge bases for fuzzy control according to the invention. Designated at 31 is a knowledge base editor, on which the user describes a fuzzy knowledge base, at 32 a knowledge base management unit for managing fuzzy control knowledge bases, at 33 a knowledge base synthesizer for synthesizing fuzzy control knowledge base, at 34 a difference intelligence extractor for extracting difference intelligence of a fuzzy control knowledge base produced by the user from a reference knowledge base, at 35 a knowledge base management master for managing all fuzzy control knowledge bases, at 36 a data configuration manager for managing the data configuration of fuzzy control knowledge bases, at 37 an actual data manager for managing actual data of fuzzy control knowledge bases, at 38 a reference base management table used for data configuration management by the data configuration manager 36, at 39 a difference membership function management table used for data configuration management by the data configuration manager 36, at 3A a difference rule management table used for data configuration management by the data configuration manager 36, at 3B a reference knowledge base memory used for actual data management by the actual data manager 37, at 3C a difference membership function memory used for actual data management by the actual data manager 37, and at 3D a difference rule memory used for actual data management by the actual data manager 37.

Figure 5:
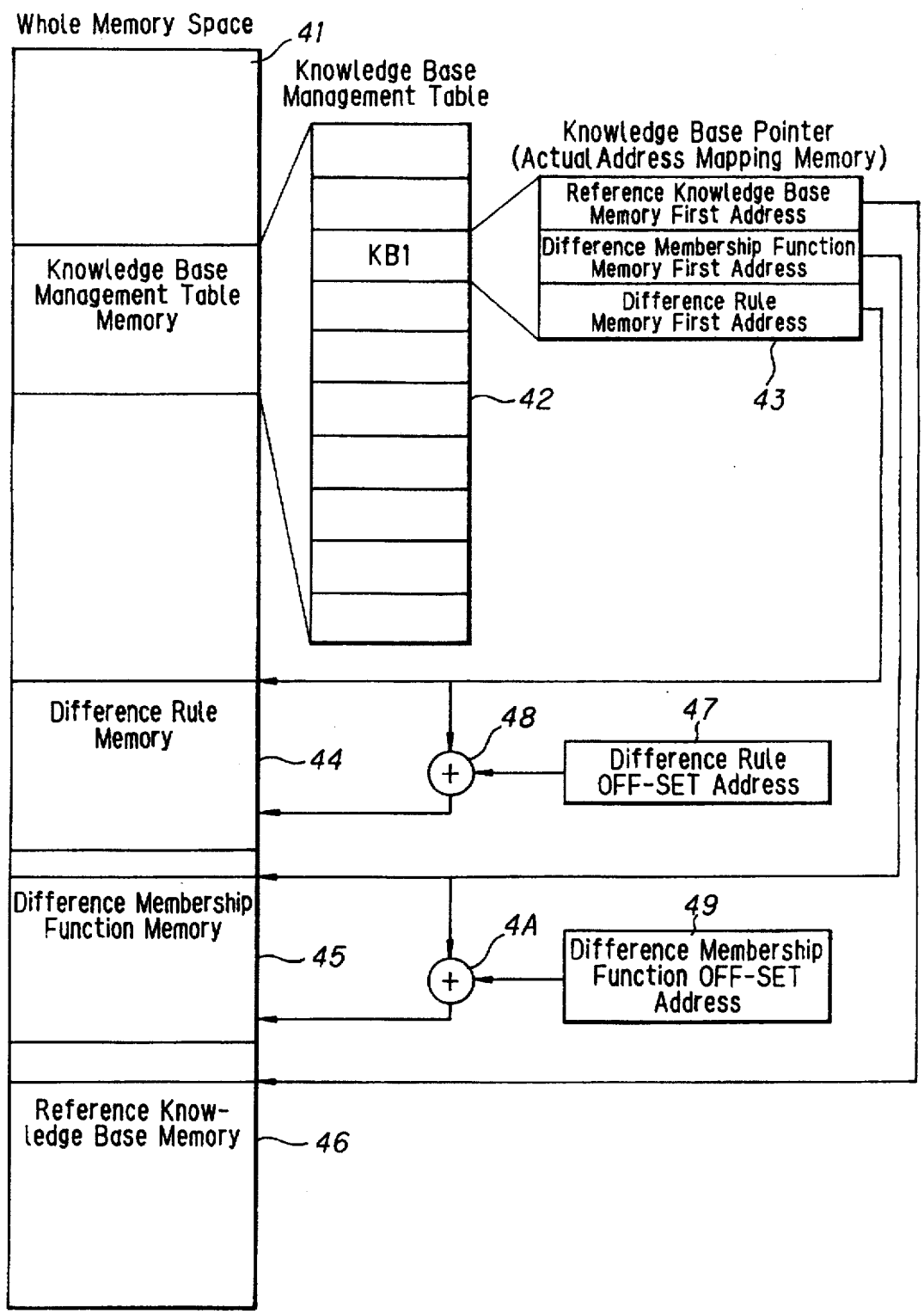
FIG. 5 is a view showing a physical configuration of a fuzzy control knowledge base memory.

FIG. 5 shows the physical structure of the fuzzy knowledge base memory. Designated at 41 is the configuration of the whole memory space, at 42 the configuration of a knowledge base management table, at 43 the configuration of a knowledge base pointer (i.e., actual address mapping memory), at 44 a difference rule memory, at 45 a difference membership memory, at 46 a reference knowledge base memory, at 47 a difference rule off-set address for a derived knowledge base, at 48 an adder for generating an address for filing a difference rule of a derived knowledge base, at 49 a difference membership function off-set address for the derived knowledge base, and at 4A an adder for generating an address for filing a difference membership function of the derived knowledge base.

Figure 6:
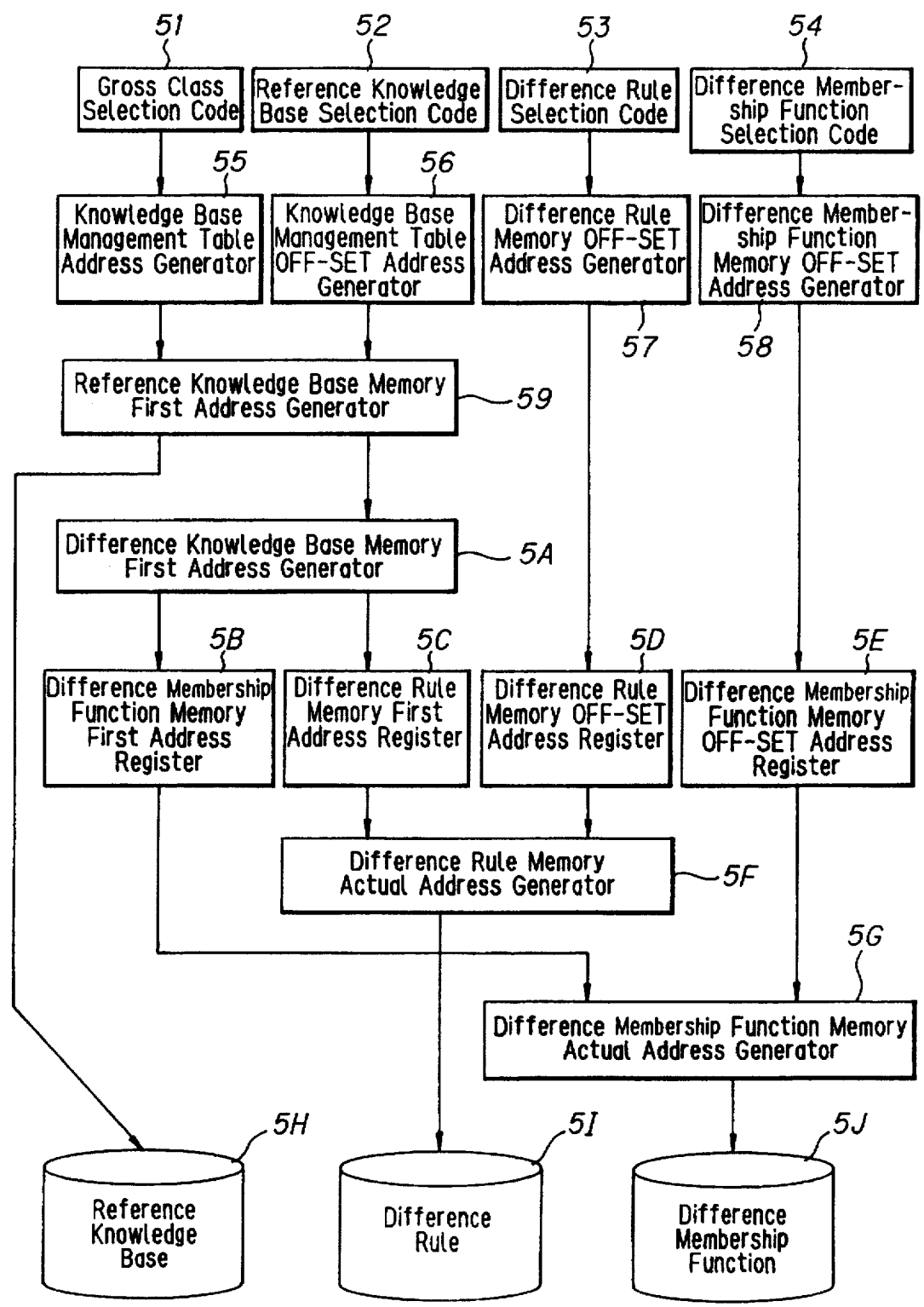
FIG. 6 is a view showing a fuzzy control knowledge base selection code and access means for accessing a knowledge base selected with the code according to the invention.

FIG. 6 shows a fuzzy control knowledge base selection code and access means for accessing a knowledge base selected according to the selection code. Designated at 51 to 54 are component codes of the fuzzy control knowledge base selection code. Designated at 51 is a gross class selection code representing the gross class of a reference knowledge base, at 52 a reference knowledge base selection code representing the reference knowledge base in the gross class, at 53 a difference rule selection code representing a difference rule for a derived knowledge base, and at 54 a difference membership function selection code representing a difference membership function for the derived knowledge base. Designated at 55 is a reference knowledge base management table first address generator, at 56 a reference knowledge base management table off-set address generator, at 57 a difference rule management table off-set address generator, at 58 a difference membership function management table off-set address generator, at 59 a reference knowledge base file address generator, at 5A a difference knowledge base memory first address generator, at 5B a difference membership function memory first address register, at 5C a difference rule memory first address register, at 5D a difference rule memory off-set address register, at 5E a difference membership function memory off-set address register, at 5F a difference rule memory actual address generator, at 5G a difference membership function memory actual address generator, at 5H a reference knowledge base memory, at 5I a difference rule memory, and at 5J a difference membership function memory.

Figure 7:
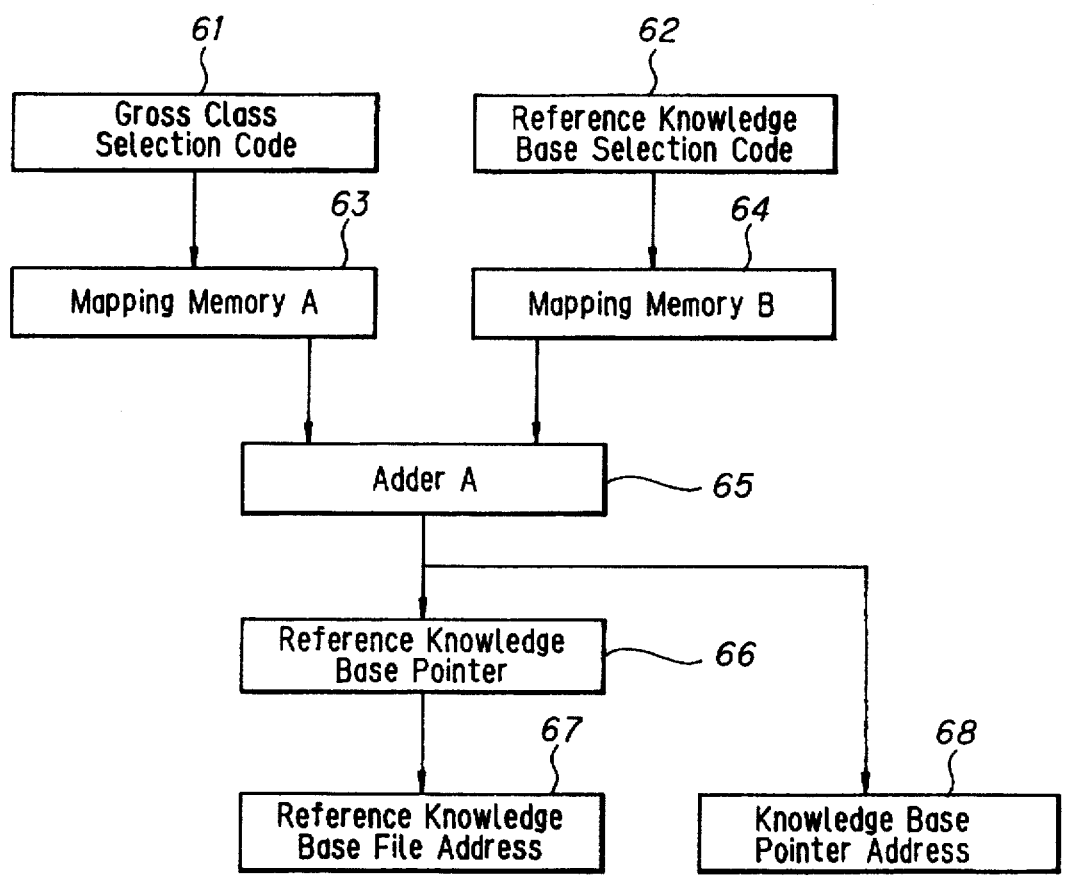
FIG. 7 is a view showing reference knowledge base memory address generation means.

FIG. 7 shows reference base memory address generation means. Designated at 61 is a gross class selection code representing the gross class of a reference knowledge base, at 62 a reference knowledge base selection code representing a reference knowledge base in the gross class, at 63 a mapping memory A for generating a gross class address corresponding to an upper address of a knowledge base pointer (actual address mapping memory) from the gross class selection code 61, at 64 a mapping memory B for generating a lower address of the knowledge base pointer from the reference base selection code 62, at 65 an adder A for generating a knowledge base pointer address by adding the output from the mapping memories A and B, at 66 a reference knowledge base pointer (i.e., actual address mapping memory) for generating reference knowledge base, difference rule and difference membership function addresses, at 67 a reference knowledge base file address generated by the knowledge base pointer, and at 68 a knowledge base pointer address.

Figure 8:
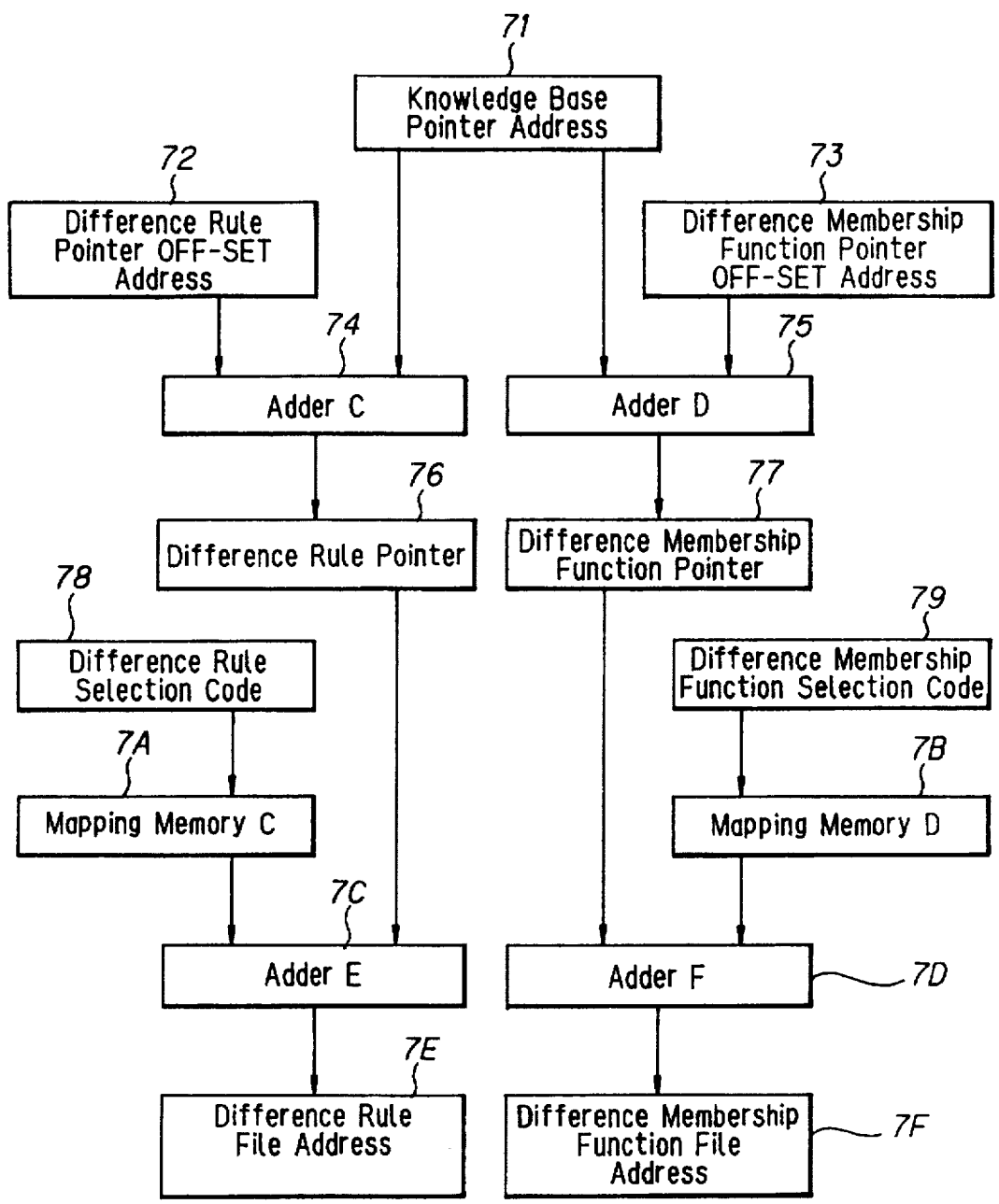
FIG. 8 is a view showing address generation means for generating difference rule and difference membership function memory addresses.

FIG. 8 shows means for generating difference rule memory address and difference membership function memory addresses. Designated at 71 is a knowledge base pointer address, at 72 a difference rule pointer off-set address for filing data about the amount of off-set from the knowledge base pointer address 71 to a difference rule pointer file address, at 73 a difference membership pointer off-set address for filing data about the amount of off-set from the knowledge base pointer address 71 to a difference membership function pointer file address, at 74 an adder C for generating a difference rule pointer address from data in the knowledge base pointer address 71 and difference rule pointer off-set address 72, at 75 an adder D for generating a difference membership function pointer address from data in the knowledge base pointer address 71 and difference membership function pointer off-set address 73.

Designated at 76 is a difference rule pointer for generating the first address of difference rule memory, at 77 a difference membership function pointer for generating the first address of difference membership function memory, at 78 a difference rule selection code for generating a lower address of a difference rule file address, at 79 a difference membership function selection code for generating a lower address of a difference membership function file address, at 7A a mapping memory C for generating a lower address of a difference rule file address, at 7B a mapping memory D for generating a lower address of a difference membership function file address, at 7C an adder E for generating the difference rule file address from difference rule memory first address data output from the difference rule pointer 76 and the output data of the mapping memory C (7A), at 7D an adder F for generating a difference membership function file address from difference membership function memory first address data output from the difference membership function pointer 77 and the output data from the mapping memory D (7B), at 7E a difference rule file address, and at 7F a difference membership function file address.

Figure 9:
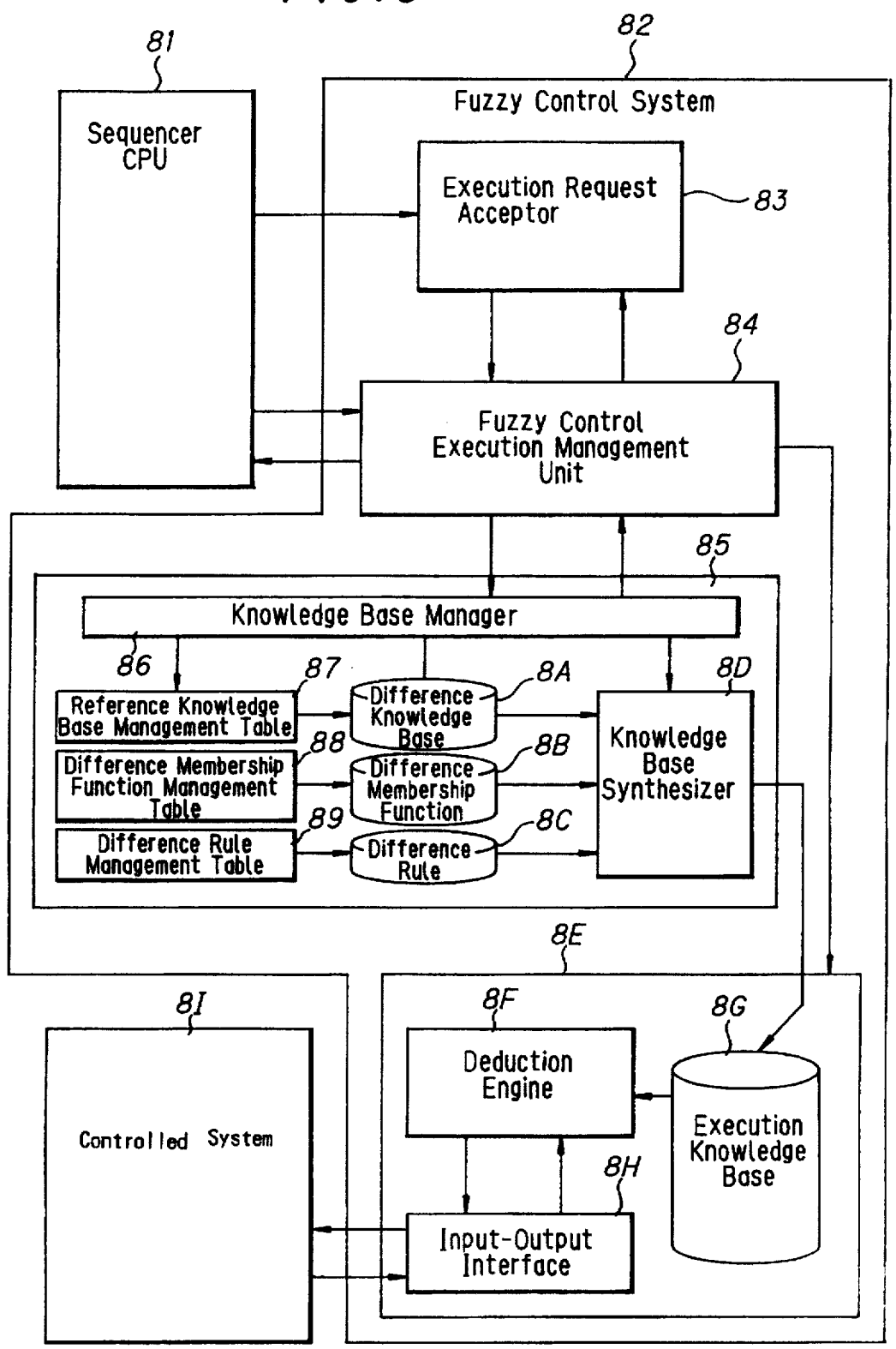
FIG. 9 is a view showing a system for controlling multiple knowledge base execution for fuzzy control according to the invention.

FIG. 9 shows a configuration of multiple knowledge base execution control apparatus of fuzzy control system. Designated at 81 is a sequencer CPU for managing the entire sequence control, at 82 a fuzzy control system for executing fuzzy control under control of the sequencer CPU 81, at 83 an execution request acceptor for accepting execution requests from the sequencer CPU 81, at 84 a fuzzy control execution management unit, at 85 a multiple knowledge base management unit in the multiple knowledge base execution control system, at 86 a knowledge base manager.

Designated at 87 is a reference knowledge base management table, at 88 a difference membership function management table, at 89 a difference rule management table, at 8A a reference knowledge base memory, at 8B a difference membership function memory, at 8C a difference rule memory, at 8D a knowledge base synthesizer, at 8E a fuzzy control execution unit in the multiple knowledge base execution control system, at 8F a deduction engine, at 8G an execution knowledge base, at 8H an input-output interface, and at 8I a controlled system.

Figure 10:
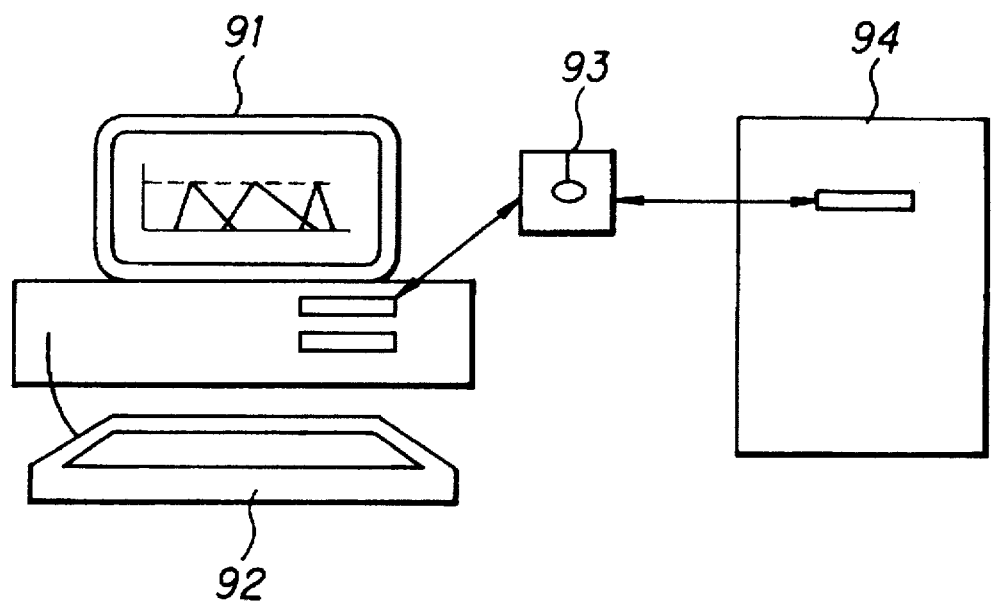
FIG. 10 is a view showing a case, in which a system for filing and managing multiple knowledge bases for fuzzy control and a system for controlling multiple knowledge base execution for fuzzy control are constructed independently and coupled to each other using a floppy disk as an interface.

FIG. 10 shows a case, in which a system for filing and managing multiple knowledge bases for fuzzy control and a system for controlling multiple knowledge base execution for fuzzy control are constructed independently, with the interface between them provided by a floppy disk. Designated at 91 is a display unit of the multiple knowledge base filing and managing system, at 92 an input unit thereof, at 93 a floppy disk, and at 94 the multiple knowledge base execution control system.

Figure 11:
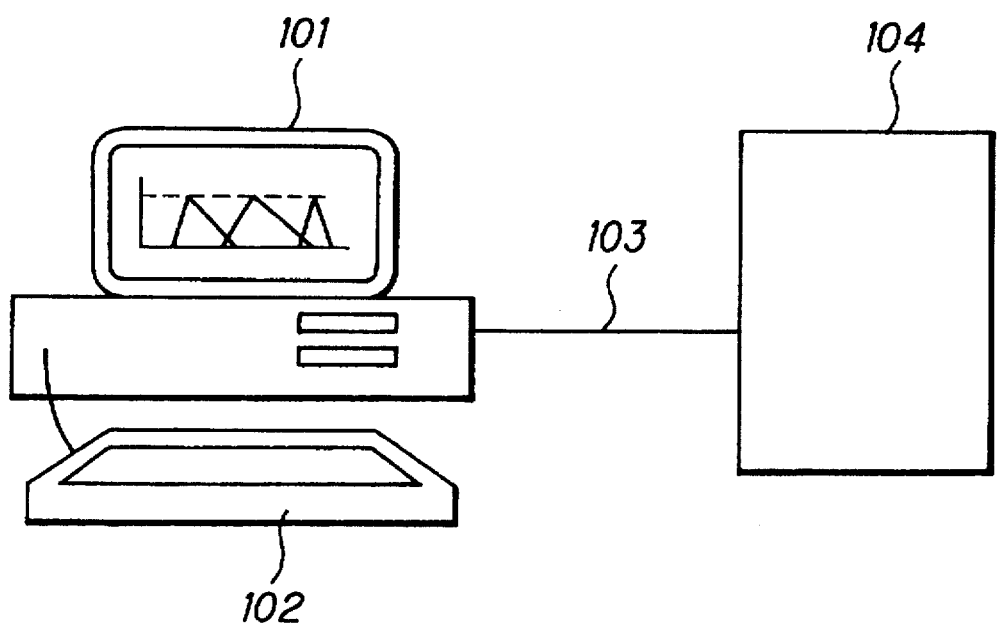
FIG. 11 is a view showing a case, in which a system for filing and managing multiple knowledge bases for fuzzy control and a system for controlling multiple knowledge base execution for fuzzy control are constructed independently and connected to each other by interface communication.

FIG. 11 shows a case, in which a system for filing and managing multiple knowledge bases for fuzzy control and a system for controlling multiple Knowledge base execution for fuzzy control are constructed independently, with the interface between them provided by a communication link. Designated at 101 is a display unit of the multiple knowledge base filing and managing system, at 102 an input unit thereof, at 103 a communication path, and at 104 the multiple knowledge base execution control system.

Figure 12:
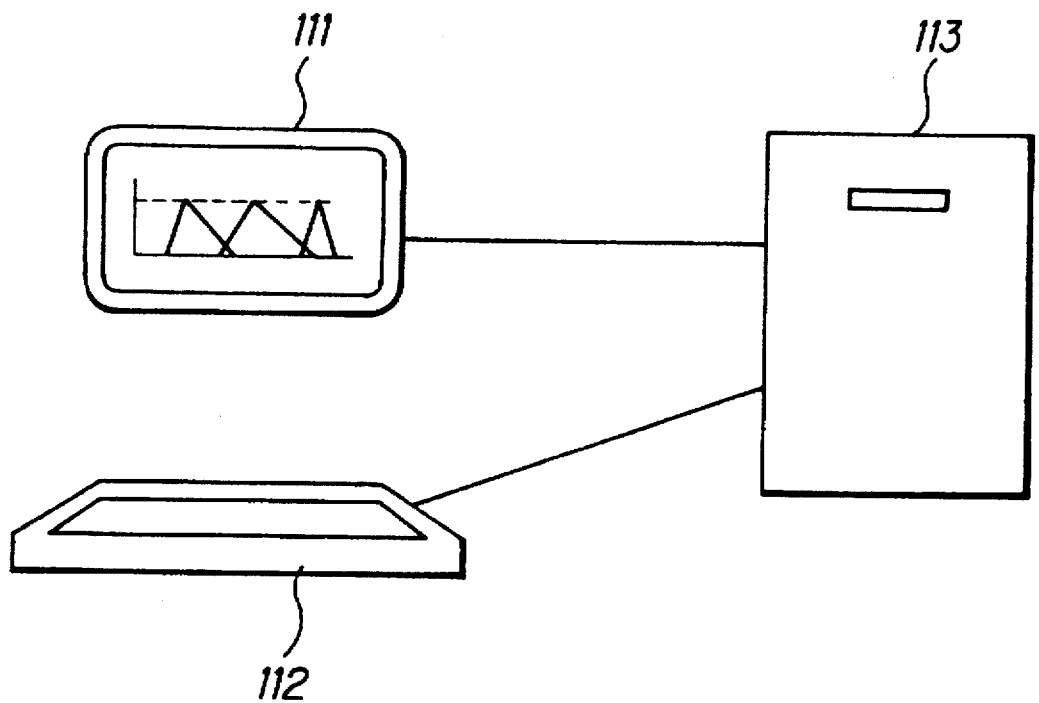
FIG. 12 is a view showing a case, in which a system for filing and managing multiple knowledge bases for fuzzy control and a system for controlling multiple knowledge base execution for fuzzy control are constructed as an integral system.
Figure 13:
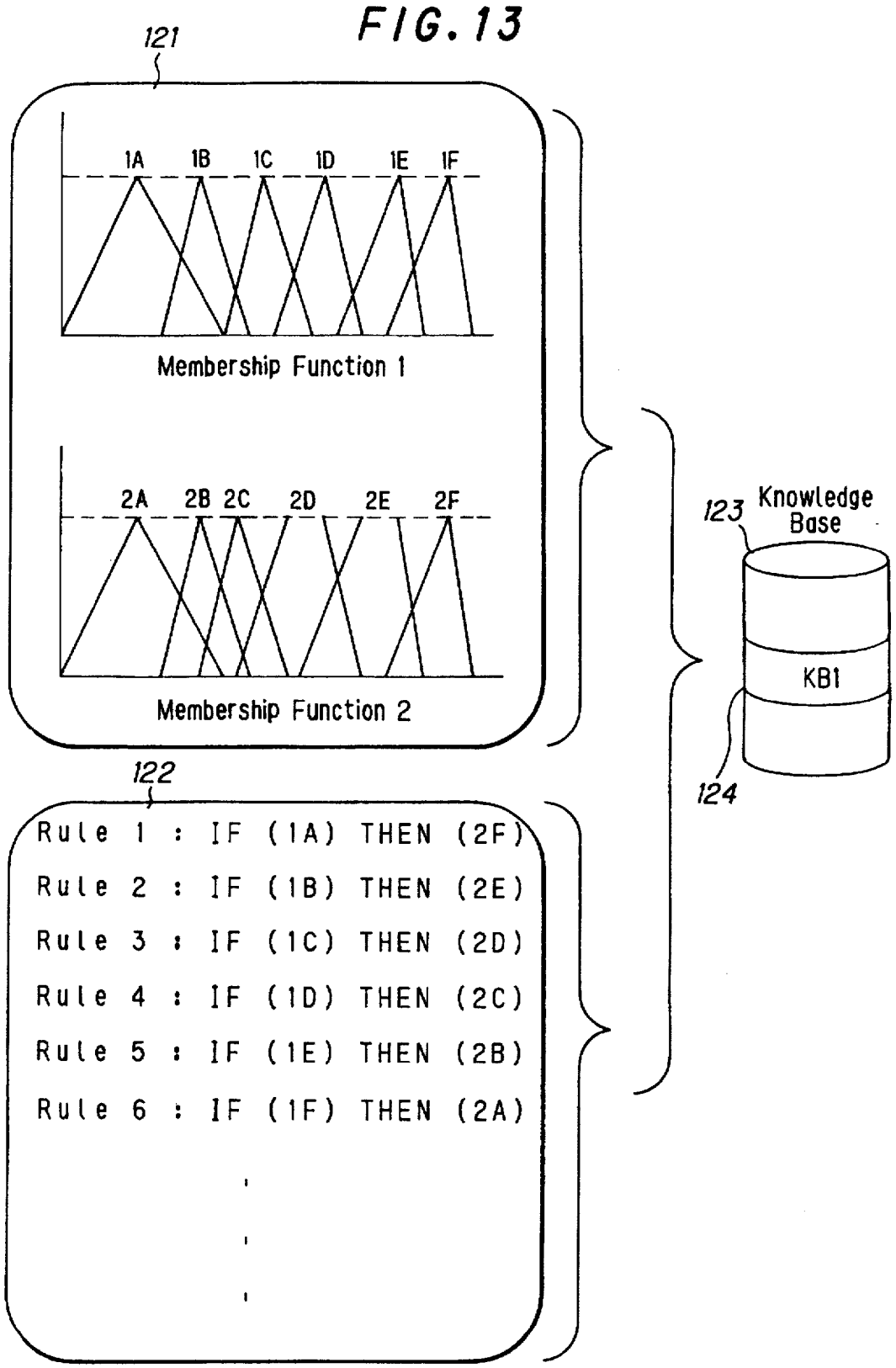
FIG. 13 is a view showing the manner of filing fuzzy control knowledge bases in a usual operating system (for instance MS-DOS, UNIX, ETC.)
Figure 14:
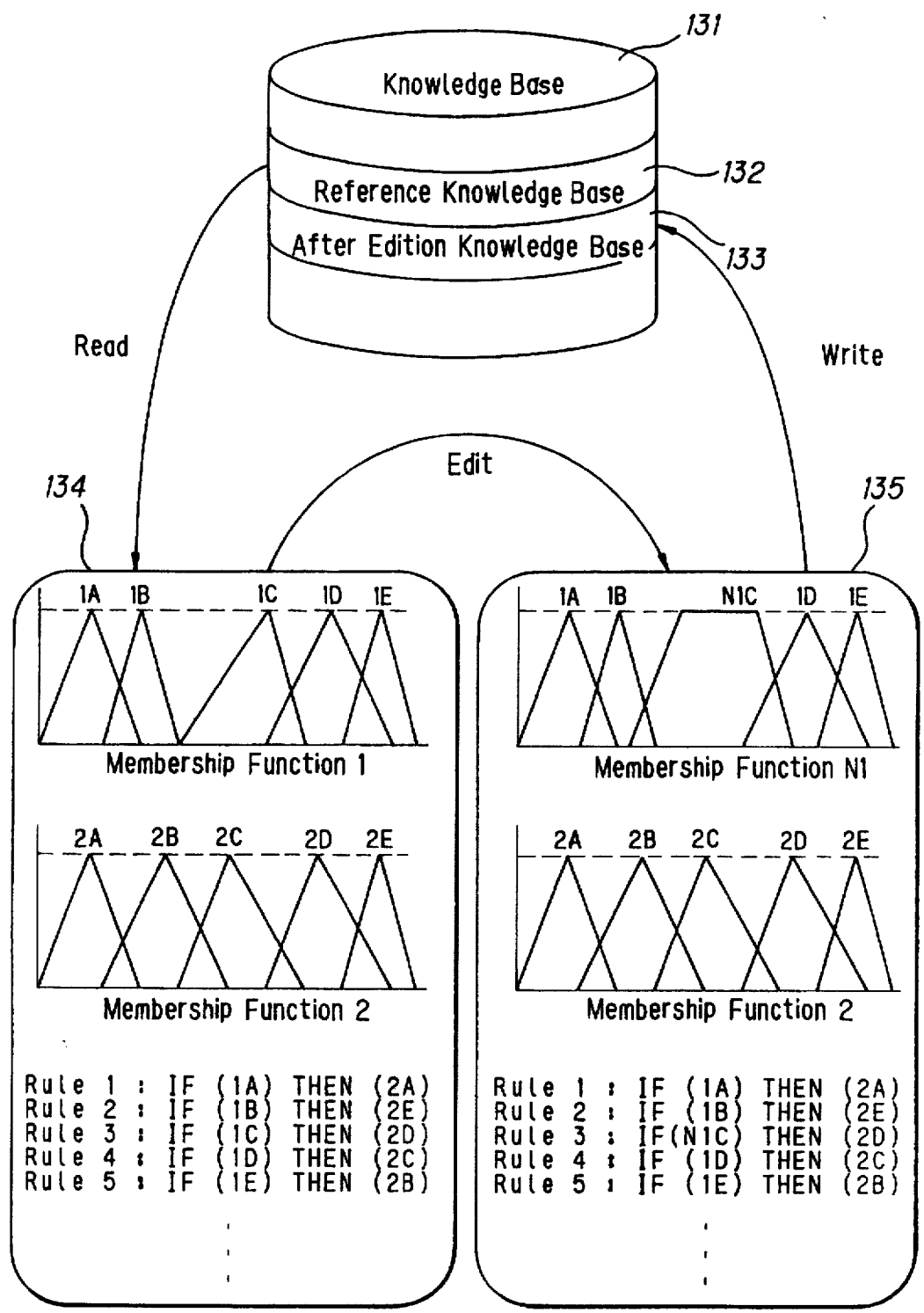
FIG. 14 is a view showing a usual fuzzy control knowledge base editing process.
Figure 15:
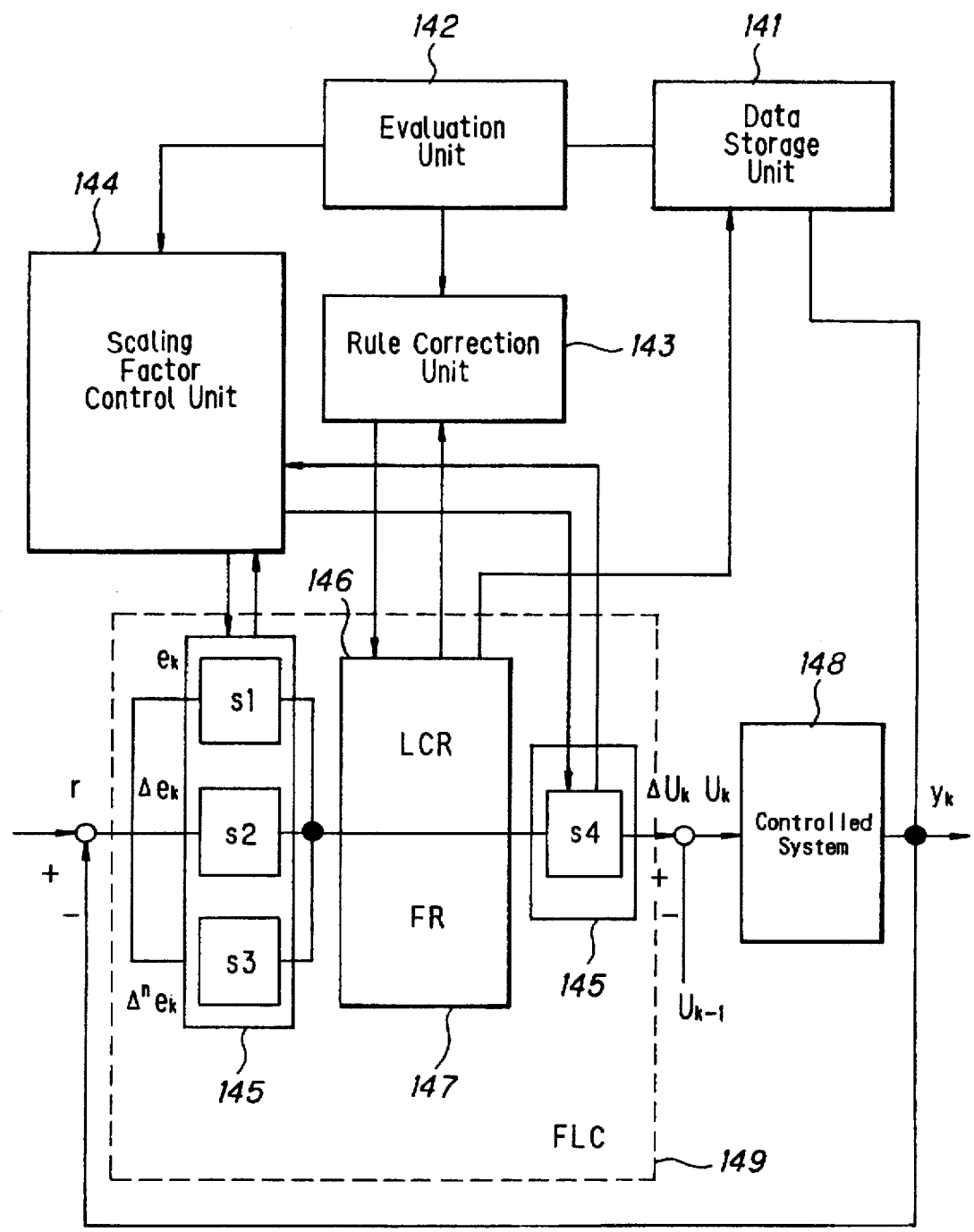
FIG. 15 is a view showing a self-controlled fuzzy control system shown in FIG. 1 of "Measurement and Control", Vol. 128, No. 11, 1989, page 954.

FIG. 12 shows a case, in which a system for filing and managing multiple knowledge bases for fuzzy control and a system for controlling multiple base execution are constructed as an integral system. Designated at 111 is a display unit, at 112 an input unit, and at 113 the multiple knowledge base execution control system.

The operation of the above embodiments will now be described with reference to the drawings.

First, (1) a concept of the operations of multiple knowledge bases that is common to the multiple knowledge base filing and managing system and multiple knowledge base execution control system in the fuzzy control system will be described with reference to the drawings. Then, (2) the operations of the multiple knowledge base filing and managing system will be described with reference to the drawings. Then, (3) the operations of the multiple knowledge base execution control system will be described with reference to the drawings. Finally, (4) interface means between the multiple knowledge base filing and managing system and multiple knowledge base execution control system will be described with reference to the drawings.

(1) Concept of Operations of Multiple Knowledge Bases

According to the invention, the necessary memory capacity for the filing and management of a plurality of knowledge bases is reduced by extracting similarities thereof. Many knowledge bases for fuzzy control are usually produced such that they are derived from a reference knowledge base that is established in advance. The difference intelligence extractor 13 fully compares the contents of the reference knowledge base 11 and the contents of the derived knowledge base 12 similar to the contents of reference knowledge base 11 and thus extracts difference intelligence. In the case of FIG. 2, the contents of label 1C in membership function 1 and rule 3 are changed. The difference intelligence extractor 13 extracts these differences and outputs them as a difference knowledge base 14. The contents of the standard, derived and difference knowledge bases 11, 12 and 14 are filed in a mutually correlated form in the multiple knowledge base filing and managing system. The data configurations of the individual knowledge bases will be described later.

For editing and reading a previously produced derived knowledge base, the necessary derived knowledge base has to be synthesized from the reference knowledge base and a knowledge base filed in the form of a difference knowledge base. FIG. 2 shows knowledge base synthesis means to this end. The derived knowledge bases in the multiple knowledge base filing and managing system, are coded for management as respective code sets comprising a code designating the reference knowledge base and codes designating respective difference knowledge bases. It is thus possible to obtain a necessary derived knowledge base through knowledge base synthesis by designating management codes.

In the case of FIG. 3, the standard and difference knowledge bases 21 and 22 are designated and transferred to the knowledge base synthesizer 23. The knowledge base synthesizer 23 synthesizes the necessary derived knowledge base 24 by substituting the contents of the difference knowledge base 22 for pertinent portions of the reference knowledge base 21. In the case of FIG. 3, the derived knowledge base 24 is synthesized by substituting label N1C of difference membership function 1 for label 1C of membership function 1 and also substituting a difference rule to rule 3 of the reference knowledge base.

(2) Operations of Multiple Knowledge Base Filing and Managing System

Operations of the multiple knowledge base filing and managing system of the fuzzy control system according to the invention will now be described with reference to FIG. 4. The operations will be described along the flow of the user's knowledge base editing operation. To start editing, the user starts the knowledge base editor 31 and designates a subject knowledge base as a knowledge base for edition. By receiving this designation, the knowledge base editor 31 outputs a subject knowledge base input request to the knowledge base management master 35. By receiving the subject knowledge base input request, the knowledge base management master 35 extracts a knowledge base selection code of the subject knowledge base and transfers the code to the data configuration manager 36. With the transferred knowledge base selection code, the data configuration manager 36 accesses the in reference knowledge base management table 38 in accordance with the knowledge base selection code and acquires the pertinent file address in the reference knowledge base file 3B. At the same time, it acquires the first addresses of the difference membership function and difference rule management tables 39 and 3A, which manage data of the difference knowledge base derived from the reference knowledge base.

The data configuration manager 36 then accesses the difference membership function management table 39 with the knowledge base selection code and acquires the file address of the pertinent different membership function in the difference membership function file 3C. The data configuration manager 36 then accesses the difference rule management table 3A with the knowledge base selection code and the first address of the difference rule management table 3A and acquires the file address of the pertinent difference rule in the difference rule 3D.

The acquired file address data concerning the reference knowledge base, difference membership function and difference rule are transferred from the data configuration manager 36 via the knowledge base management master 35 to the actual data manager 37. According to the transferred address data, the actual data manager 37 obtains pertinent data and transfers the data to the knowledge base synthesizer 33 under control of the knowledge base management master 35. At the same time, the knowledge base management master 35 transfers the sole reference knowledge base contents to the difference intelligence extractor 34. The knowledge base synthesizer 33 synthesizes a subject knowledge base in the manner as described before in connection with FIG. 2 and transfers the synthesized subject knowledge base to the knowledge base editor 31. Then, the user performs editing on the subject knowledge base on the knowledge base editor 31 and decides the result of editing as a knowledge base after edition. When it is intended by the user to file the knowledge base decided after editing on the multiple knowledge base filing and managing system, a knowledge base transfer request is outputted from the knowledge base editor 31 to the knowledge base management master 35. By receiving the knowledge base output request, the knowledge base management master 35 transfers the decided knowledge base after edition to the difference intelligence extractor 34 from the knowledge base editor 31.

The difference intelligence extractor 34 fully compares the contents of the decided knowledge base transferred from the knowledge base editor 31 with the contents of the reference knowledge base which has been transferred in advance from the knowledge base management master 35. Thus, it extracts difference intelligence, and then it produces difference membership function and difference rule, which are output to the knowledge base management master 35. The knowledge management master 35 transfers the difference membership function and difference rule together with the reference knowledge base selection code to the data configuration manager 36 and also to the actual data manager 37. The actual data manager 37 determines and files file addresses for filing the transferred difference membership function and difference rule. Then, the actual data manager 37 transfers the file address data concerning the transferred difference membership function and difference rule via the knowledge base manager 35 to the data configuration manager 36. The data configuration manager 36 registers the transferred difference membership function and difference rule in the respective difference membership function and difference rule management tables.

FIG. 5 shows the physical configuration of the fuzzy control knowledge base memory. The whole memory area 41 includes the knowledge base management table memory area 42, difference rule memory area 44, difference membership function memory area 45 and reference knowledge base memory area 46. These memory areas need not be continuous because they are managed by pointers. The knowledge base management table memory 42 has a configuration as shown in detail in a central part of FIG. 5. It has a plurality of knowledge base pointers 43. Each knowledge base pointer 43 is an actual address mapping memory and has a configuration as shown in detail in a left part of FIG. 5. It is formed for each reference knowledge base memory and has a file of the first address data about the reference knowledge base, difference membership function and difference rule memories 46, 45 and 44.

There are multiplicities of difference rules and difference membership functions with respect to each reference knowledge base. The difference rule memory 44 is provided for the reference knowledge bases, and it has a file of all difference rules pertinent to the reference knowledge bases. The difference membership function memory 45 is again provided for the reference knowledge bases, and it has a file of all difference membership functions pertinent to the reference knowledge bases. The difference rule file address of the pertinent derived knowledge base is synthesized in the adder 48 from the first address of the pertinent difference rule memory and the difference rule off-set address 47. The difference membership function file address of the pertinent derived knowledge base is synthesized in the adder 4A from the first address of the pertinent difference membership memory and the difference membership function off-set address 48.

FIG. 6 shows the fuzzy control knowledge base selection code and access means to knowledge base selected by the code according to the invention. The operation will be described along a flow until generation of pertinent file addresses of reference knowledge base 5H, difference rule 5I and difference membership function 5J after decoding of the knowledge base selection code. Designated at 51 to 54 are components of the fuzzy control knowledge base selection code. The gross class selection code 51 designates the first address (i.e., an upper address) of the knowledge base management table 42 shown in FIG. 5.

Where there are a plurality of reference knowledge bases in the system shown in FIG. 5, the gross class selection code 51 is used to select one of these reference knowledge bases. The reference knowledge base selection code 52 designates the off-set address (i.e., a lower address) of the knowledge base management table 42 shown in FIG. 5. The gross class selection code 51 is transferred to the knowledge base management table first address generator 55 for conversion to knowledge base management table first address data, which is transferred to the reference knowledge base memory first address generator 59. The reference knowledge base selection code 52 is transferred to the knowledge base management table off-set address generator 56 for conversion to knowledge base management table off-set address data, which is transferred to the reference knowledge base memory first address generator 59. The reference knowledge base first address generator 59 generates the first address of the pertinent knowledge base pointer 43 from the first address of reference knowledge base and the off-set addresses of the knowledge base management table. The first address data of the pertinent knowledge base pointer 43 is then transferred to the difference knowledge base memory first address generator 5A, and at the same time the first address of the pertinent reference knowledge base is generated by reading out reference knowledge base memory first address data from the knowledge base pointer 43. The difference knowledge base memory first address generator 5A generates the difference membership function and difference rule memory first addresses from the transferred first address of the pertinent knowledge base pointer 43. The generated difference membership function memory first address data is transferred to the difference membership function memory first address register 5B, while the generated difference rule memory first address data is transferred to the difference rule memory first address register 5C.

The difference rule selection code 53 is for selecting the pertinent difference rule among a plurality of difference rules filed in the difference rule memory. This difference rule selection code 53 is transferred to the difference rule memory off-set address generator 57 for conversion to difference rule memory off-set address data, which is transferred to the difference rule memory off-set address register 5D. When data are registered in the difference rule memory first and off-set address registers 5C and 5D, the two data are transferred to the difference rule memory actual address generator 5F to generate difference rule memory actual address data.

Using this difference rule memory actual address data, the pertinent difference rule is read out from the difference rule file 5I. The difference membership function selection code 54 is for selecting the pertinent difference membership function among a plurality of difference membership functions filed in the difference membership function memory. This difference membership function selection code 54 is transferred to the difference membership function memory off-set address generator 5S for conversion to difference membership function memory off-set address data, which is transferred to the difference membership function memory off-set address register 5E.

When data are registered in the difference membership function memory first and off-set address registers 5B and 5E, the two data are transferred to the difference membership function memory actual address generator 5G to generate difference membership function memory actual address data. Using this data, the pertinent difference membership function is read out from the difference membership function 5J.

FIG. 7 specifically shows means for generating a reference knowledge base memory address. The gross class selection code 61 concerning the reference knowledge base is converted by the mapping memory A 63 into knowledge base management table first address data. The reference knowledge base selection code 62 in the gross class is converted by the mapping memory B 64 into knowledge base management table off-set address data. The data generated in the mapping memories A 63 and B 64 are transferred to the adder A 65 and added together to generate knowledge base pointer address data. This knowledge base pointer address data is transferred to the reference knowledge base pointer 66 and converted into reference knowledge base file address data.

FIG. 8 shows means for generating difference rule and difference membership function file addresses. The knowledge base pointer address 71 is generated from the adder A (65) shown in FIG. 7. The knowledge base pointer address 72 has a data file about the amount of off-set from the knowledge base pointer address 71 till the difference rule pointer file address. The adder C (74) adds data from the knowledge base pointer address 71 and difference pointer off-set address 72 and thus generates a difference rule pointer address. The difference rule pointer 76 generates the difference rule memory first address from the difference rule pointer address.

The difference rule selection code 78 is for generating lower address of the difference rule file address, and it is transferred to the mapping memory C (7A) for conversion into the lower address of the difference rule file address. The adder E (7C) adds the difference rule memory first address output from the difference rule pointer 76 and the data from the mapping memory C (7A) and thus generates the difference rule file address 7E. The difference membership function pointer off-set address 73 has a data file about the amount of off-set from the knowledge base pointer address 71 to the difference membership function pointer file address. The adder D (75) adds data from knowledge base pointer address 71 and the difference membership function pointer off-set address 73 and thus generates a difference membership function pointer address.

The difference membership relation pointer 77 generates a difference membership function memory first address from the difference membership function pointer address. The difference membership function selection code 79 is for generating lower address of the difference membership function file address, and it is transferred to the mapping memory D (7B) for conversion into the lower address of the difference membership function file address. The adder F (7D) adds the difference membership function memory first address output from the difference membership function pointer 77 and the data from the mapping memory D (7B) and thus generates the difference membership function file address 7F.

(3) Operations of Multiple Knowledge Base Execution Control system

Operations of the multiple knowledge base execution control system of the fuzzy control system according to the invention will now be described with reference to FIG. 9. The operations of the whole sequence control are managed by the sequencer CPU 81. In the fuzzy control system 82, the fuzzy control is executed under control of the sequencer CPU 81. The operation of the fuzzy control system 82 in response to commands received from the sequencer CPU 81 will be described sequentially. Prior to the execution of fuzzy control, a fuzzy control knowledge base group is transferred from the sequencer CPU 81 via the fuzzy control execution management unit 84 to the multiple knowledge base management unit 85 in the multiple knowledge base execution control system of the fuzzy control system.

The multiple knowledge base management unit 85 in the multiple knowledge base execution control system according to the fuzzy control system, has the same functions and structure as those of the multiple knowledge base management unit shown in FIG. 4 except that it does not have any difference intelligence extractor which is unnecessary for the control. The fuzzy control knowledge base transferred from the sequencer CPU is filed in the reference knowledge base management table 87, difference membership function management table 88, difference rule management table 89, reference knowledge base memory 8A, difference membership function memory 8B and difference rule memory 8C under control of the knowledge base manager 86.

When starting fuzzy control, the sequencer CPU 81 transfers an execution request to the execution request acceptor 83. The execution acceptor 83 comprises a FIFO buffer and transfers accepted execution requests in the order of the acceptance to the fuzzy control execution management unit 84. The content of the execution request includes knowledge base code and so forth as shown in FIG. 6. The fuzzy control execution management unit 84 delivers commands to the multiple knowledge base management unit 85 to cause the knowledge base synthesizer 8D to generate the pertinent derived knowledge base under control of the knowledge base manager 86. Meanwhile, for managing the fuzzy control system in cooperation with the sequencer CPU 81, the fuzzy control execution control unit 84 transfers information about the current state of execution and also the new knowledge base preparation status to the sequencer CPU 81 and then waits for a knowledge base switch command from the sequencer CPU 81.

From the current state of execution and the new knowledge base preparation status, the sequencer CPU 81 judges a knowledge base switch timing and delivers a knowledge base switch command to the fuzzy control execution management unit 84. By receiving the knowledge base switch command from the sequencer CPU 81, the fuzzy control execution management unit 84 transfers the derived knowledge base synthesized in the knowledge base synthesizer 8D to the execution knowledge base file 8G in the fuzzy control execution unit 8E The deduction engine 8F executes fuzzy control of the controlled system 8I by using execution knowledge base read out from the execution knowledge base file 8G and also data obtained from the controlled system 8I via the input-output interface 8H.

(4) Interface Means between Multiple Knowledge Base Filing and Managing System and Multiple Knowledge Base Rule Execution Control System In the arrangement shown in FIG. 10, the multiple knowledge base filing and managing system and multiple knowledge base execution control system of the fuzzy control system are constructed independently, and floppy disk is used for the interface between them. This arrangement is suited in case where the multiple knowledge base filing and managing system and the multiple knowledge base execution control system are located at distant positions from each other. A fuzzy control knowledge base, which is produced on the multiple base filing and managing system using the display and input units 91 and 92, is transferred to the multiple knowledge base execution system 94 using the floppy disk 93 or a memory card or like external memory means.

In the arrangement shown in FIG. 11, the multiple knowledge base filing and managing system and multiple knowledge base execution system of the fuzzy control system are constructed independently, and communication through parallel path or a serial line is used for the interface between them. A fuzzy control knowledge base, which is produced on the multiple knowledge base filing and managing system using the display and input units 101 and 102 is transferred to the multiple base execution system 104 via the communication channel 103 using parallel paths or a serial line.

In the arrangement shown in FIG. 12, the multiple knowledge base filing and managing system and multiple base execution control system of the fuzzy control system are constructed to be integral with each other. The display and input units 111 and 112 are connected directly to the multiple knowledge base filing and managing system 113 for production of fuzzy control knowledge bases and control of the knowledge base execution.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of utilizing a plurality of knowledge bases for a fuzzy control system operative to execute an individual knowledge base according to the status of a system to be controlled, comprising:

storing a standard knowledge base comprising a plurality of standard membership functions and a plurality of standard rules;

storing a derived knowledge base comprising a plurality of derived membership functions and a plurality of derived rules;

comparing the rules and membership functions of said standard knowledge base and said derived knowledge base and extracting differences therebetween; and storing non-zero difference membership functions and difference rules in a difference knowledge base;

wherein said standard knowledge base, said derived knowledge base and said difference knowledge base are mutually correlated.

2. A method of utilizing a plurality of knowledge bases for a fuzzy control system as set forth in claim 1, further comprising synthesizing a knowledge base by reading out correlated information from said standard knowledge base and said difference knowledge base, wherein said storing step only stores non-zero difference membership functions and difference rules in said difference knowledge base.

3. A fuzzy control system comprising a plurality of knowledge bases selectively accessible for execution of an individual knowledge base according to the status of a system to be controlled, comprising:

a reference knowledge base for storing a plurality of standard membership functions and a plurality of standard rules;

a derived knowledge base for storing a plurality of derived membership functions and a plurality of derived rules;

means for comparing the rules and membership functions of said reference knowledge base and said derived knowledge base and extracting differences therebetween; and means for storing non-zero difference membership functions and difference rules in a difference knowledge base;

wherein said reference knowledge base, said derived knowledge base and said difference knowledge base comprise a plurality of fuzzy control knowledge bases that are mutually correlated.

4. A fuzzy control system as set forth in claim 3, further comprising:

knowledge base editing means for designating a subject knowledge base for edition;

knowledge base management unit means in communication with said knowledge base editing means for managing said plurality of fuzzy control knowledge bases, said unit comprising a knowledge base manager and a management table file means for filing data configuration information;

wherein said knowledge base manager comprises:

a knowledge base synthesis means operative to access said knowledge base and said difference knowledge base for synthesizing a derived knowledge base;

difference intelligence extraction means for extracting difference intelligence of said synthesized knowledge base from said reference knowledge base;

data configuration management means operative in connection with said management table file means for managing the data structure of said plurality of knowledge bases;

actual data management means for managing actual knowledge base data in said storing means; and knowledge base master means for managing knowledge base by collectively controlling said individual means.

5. A fuzzy control system as set forth in claim 4, wherein said knowledge base synthesis means comprises:

membership function deleter means for deleting a portion of a reference membership function and substituting for said portion a difference membership function;

rule deleter means for deleting a portion of a reference rule and substituting for said portion a difference rule; and difference knowledge base introducing means for combining difference knowledge base information with said reference knowledge base information and generating said derived knowledge base.

6. A fuzzy control system as set forth in claim 4, wherein said difference intelligence extraction means comprises:

a comparator for comparing a reference knowledge base and a knowledge base obtained after edition; and a difference intelligence extractor for extracting difference intelligence between the knowledge base obtained after edition and a correlated reference knowledge base.

7. A fuzzy control system as set forth in claim 4, wherein said management table file means comprises:

a reference knowledge base management table for managing the location of a group of reference knowledge bases;

a difference membership function management table for managing the location of a group of difference membership functions; and a difference rule management table for managing the location of a group of difference rules.

8. A fuzzy control system as set forth in claim 4, wherein said management table file means comprises:

a reference knowledge base memory address generation means for generating a reference knowledge base memory address;

difference membership function memory address generation means for generating a difference membership function memory address; and difference rule memory address generation means for generating a difference rule memory address.

9. A fuzzy control system as set forth in claim 8, wherein said reference knowledge base memory address generation means comprises:

means for generating a gross class selection code for designating the gross class of a reference knowledge base;

means for generating a reference knowledge base selection code for designating a first address of said reference knowledge base;

gross class selection code mapping memory means for generating a gross class first address from a gross class selection code;

reference knowledge base selection code mapping memory means for generating said first address of said reference knowledge base from said reference knowledge base selection code;

adder means for generating an actual address by adding a gross class first address and a reference knowledge base first address; and means for generating a reference knowledge base pointer to a reference knowledge base address.

10. A fuzzy control system as set forth in claim 8, wherein said difference function memory address generation means comprises:

means for generating a knowledge base pointer address for filing the first address of a knowledge base pointer;

means for generating a difference membership function pointer off-set address for filing data about the amount of off-set from the first address of the knowledge base pointer to a difference membership function pointer;

adder means for generating a difference membership function pointer address from the first address of the knowledge base pointer and the difference membership function pointer off-set address;

means for generating a difference membership function pointer for filing the first address of a difference membership function;

means for generating a difference membership function selection code for generating a lower address of said difference membership function file address by using a difference membership function selection code mapping memory, said difference membership function selection code mapping memory being operative for generating a lower address of a difference membership function file address in accordance with a difference membership function selection code; and a difference membership function file address adder for generating a difference membership function file address in accordance with a difference membership function pointer and a difference membership function lower address.

11. A fuzzy control system as set forth in claim 8, wherein said difference rule memory address generation means comprises:

means for generating a knowledge base pointer address for filing the first address of a knowledge base pointer;

means for generating a difference rule pointer off-set address for filing data defining the amount of off-set from the first address of a knowledge base pointer to the difference rule pointer;

adder means for generating a difference rule pointer address from the first address of the knowledge base pointer to the difference rule pointer off-set address;

means for generating a difference rule pointer for filing the first address of a difference rule file address;

means for generating a difference rule selection code for generating a lower address of a difference rule file address by using a difference rule selection code mapping memory, said difference rule selection code mapping memory being operative for generating a lower address of a difference rule file address from a difference rule selection code; and difference rule file address generation adder means for generating a difference rule file address from difference rule pointer data and the difference rule file address lower address.

12. A fuzzy control system as set forth in claim 4, wherein said management table file means comprises:

knowledge base management table means for filing configuration data of plural knowledge bases;

knowledge base pointers means for filing a first address of each of a reference knowledge base and a difference knowledge base;

difference rule off-set address adder means for generating an address for filing an actual difference rule; and difference membership function off-set address adder means for generating an address for filing an actual difference membership function.

13. A knowledge base manager means according to claim 4, comprising:

knowledge base synthesizer means for synthesizing a derived knowledge base from said reference knowledge base and said difference knowledge base;

difference intelligence extractor means for generating a difference knowledge base by comparing the reference knowledge and derived knowledge bases;

data configuration manager means for managing the configurations of reference and difference knowledge bases;

management table file means for maintaining and managing knowledge base configurations;

actual data manager means for filing knowledge base data; and knowledge base management master means for controlling the flow of all data.

14. A fuzzy control system operative in response to a sequencer for generating execution requests for selectively using plural knowledge bases for fuzzy control according to the status of a system to be controlled comprising:

knowledge base management means for executing selected ones of a plurality of knowledge bases;

fuzzy control execution management means for managing the execution of fuzzy control by instructing the generation, selection and timing of switching of a knowledge base for execution according to an execution request from the sequencer;

execution knowledge base file means for filing execution knowledge bases generated according to a request from the sequencer; and fuzzy control execution management means having fuzzy deduction functions for executing fuzzy control.

15. A fuzzy control system as set forth in claim 14, wherein said knowledge base management means comprises:

knowledge base synthesizer means for synthesizing a derived knowledge base from a reference knowledge base and a difference knowledge base;

data configuration manager means for managing the configurations of reference and difference knowledge base;

management table file means for maintaining and managing knowledge base configurations;

actual data management means for filing knowledge base data; and a knowledge base management master for controlling the flow of data within said knowledge base management means.

16. A fuzzy control system as set forth in claim 15, wherein said management table file means comprises:

reference knowledge base memory address generation means for generating a reference knowledge base memory address;

difference membership function memory address generation means for generating a difference membership function memory address; and difference rule memory address generation means for generating a difference rule memory address.

17. A fuzzy control system as set forth in claim 16, wherein said reference knowledge base memory address generation means comprises:

means for generating a gross class selection code for designating the gross class of a reference knowledge base;

means for generating a reference knowledge base selection code for generating the first address of the reference knowledge base;

gross class selection code mapping memory means for generating a gross class first address from a gross class selection code;

reference knowledge base selection code mapping memory means for generating the first address of the reference knowledge base from a reference knowledge base selection code;

adder means for generating an actual address by adding a gross class first address and a reference knowledge base first address; and means for generating a reference knowledge base pointer for generating a reference knowledge base address.

18. A fuzzy control system as set forth in claim 16, wherein said difference membership function memory address generation means comprises:
   means for generating a knowledge base pointer address for filing the first address of a knowledge base pointer;
   means for generating a difference membership function pointer off-set address for filing data about the amount of off-set from the first address of the knowledge base pointer to a difference membership function pointer;
   adder means for generating a difference membership function pointer address from the first address of the knowledge base pointer and the difference membership function pointer off-set address;
   means for generating a difference membership function pointer for filing the first address of a difference membership function;
   means for generating a difference membership function selection code for generating a lower address of said difference membership function file address by using a difference membership function selection code mapping memory, said difference membership function selection code mapping memory for generating a lower address of a difference membership function file address by output from a difference membership function selection code; and
   difference membership function file address adder means for generating the difference membership function file address from data from a difference membership function pointer and a difference membership function lower address.

19. A fuzzy control system as set forth in claim 15, wherein said management table file means comprises:
   a knowledge base management table for filing configuration data of plural knowledge bases;
   knowledge base pointers means for filing the first addresses of a reference and a difference knowledge base constituting each knowledge base;
   difference rule off-set address adder means for calculating an address for filing an actual difference rule; and
   a difference membership function off-set address adder for calculating an address for filing an actual difference membership function.

20. A fuzzy control system as set forth in claim 15, wherein said difference rule memory address generation means comprises:
   means for generating a knowledge base pointer address for filing the first address of a knowledge base pointer;
   means for generating a difference rule pointer off-set address for filing data about the amount of off-set from the first address of a knowledge base pointer to the difference rule pointer;
   adder means for generating a difference rule pointer address from the first address of the knowledge base pointer to the difference rule pointer off-set address;
   means for generating a difference rule pointer for filing the first address of a difference rule file address;
   means for generating a difference rule selection code for generating a lower address of a difference rule file address by using a difference rule selection code mapping memory, said difference rule selection code mapping memory being operative for generating a lower address of a difference rule file address from a difference rule selection code; and
   difference rule file address generation adder means for generating a difference rule file address from difference rule pointer data and the difference rule file address lower address.

21. A fuzzy control system as set forth in claim 15, wherein said actual data management means comprises:
   reference knowledge base memory means for filing reference knowledge base data;
   difference membership function memory means for filing difference membership function data; and
   difference rule memory means for filing difference rule data.

22. A fuzzy control system as set forth in claim 15, wherein said knowledge base synthesizer means comprises:
   membership function deleter means for deleting a portion of a reference membership function and substituting therefor a difference membership function;
   rule deleter means for deleting a portion of a reference rule and substituting therefor a difference rule; and
   difference knowledge base introducer means for introducing difference knowledge base data into a reference knowledge base.

23. A fuzzy control system as set forth in claim 15, wherein said knowledge base management means comprises an execution request acceptance means having:
   a FIFO buffer for accepting execution requests from the sequencer in the order of arrival and outputting said accepted execution requests in the order of arrival.

24. A fuzzy control system as set forth in claim 15, wherein said fuzzy control execution management means comprises:
   a sequencer CPU interface for realizing data exchange between a sequencer CPU and said fuzzy control system;
   a multiple knowledge base management unit interface for realizing transfer of commands to said multiple knowledge base management unit and monitoring the status of said multiple knowledge base management unit;
   a fuzzy control execution unit interface for realizing transfer of commands to a fuzzy control execution unit and monitoring of the status of said fuzzy control execution unit; and
   an execution request acceptance unit interface for realizing transfer of commands to an execution request acceptance unit and monitoring the status of said execution request acceptance unit.

25. A fuzzy control system as set forth in claim 15, further comprising an input-output interface means directly coupled to a controlled system.

26. A fuzzy control system as set forth in claim 14, wherein said execution knowledge base file means comprises:
   an execution knowledge base memory for filing an execution knowledge base to be actually executed;
   a fuzzy control execution management unit interface for realizing acceptance of commands from a fuzzy control execution management unit and transfer of status data to said fuzzy control execution management unit; and
   a multiple base management unit interface for realizing transfer of a synthesized knowledge base for actual execution from a multiple knowledge base management unit.

27. A fuzzy control system as set forth in claim 14, wherein said fuzzy control execution means comprises:
   an execution knowledge base memory for filing an execution knowledge base to be used actually for control;

a deduction engine for performing actual deduction by using an execution knowledge base; and an input-output interface for exchanging data with respect to a controlled system.

28. A fuzzy control system allowing use of an individual knowledge base according to states of a system to be controlled, comprising:

a predetermined control knowledge base group; and a sequencer CPU for providing instructions to control the generation, selection, and timing of switching of said predetermined control knowledge base group in dependence on the status of said controlled system to provide fuzzy control of said system.

* * * * *